United States Patent [19]

Zhou et al.

[11] Patent Number: 5,956,333
[45] Date of Patent: Sep. 21, 1999

[54] MULTI-USER DEMODULATOR FOR CDMA SPECTRUM SPREADING COMMUNICATION

[75] Inventors: Changming Zhou; Guoliang Shou; Kenzo Urabe; Tetsuhiko Miyatani, all of Tokyo, Japan

[73] Assignees: Yozan Inc., Tokyo, Japan; Kokusai Electric, Tokyo, Japan

[21] Appl. No.: 08/781,631

[22] Filed: Jan. 10, 1997

[30] Foreign Application Priority Data

Jan. 12, 1996 [JP] Japan .................................... 8-021869

[51] Int. Cl.$^6$ ...................................................... H04K 1/00
[52] U.S. Cl. .......................... 370/342; 375/200; 375/229; 375/349
[58] Field of Search ................................... 370/342, 497; 375/200, 206, 207, 208, 209, 210

[56] References Cited

U.S. PATENT DOCUMENTS

| | | | |
|---|---|---|---|
| 4,134,071 | 1/1979 | Ohnsorge . | |
| 4,744,093 | 5/1988 | Arai et al. | 375/76 |
| 5,136,612 | 8/1992 | Bi | 375/1 |
| 5,164,959 | 11/1992 | Cai et al. | 375/1 |
| 5,361,219 | 11/1994 | Shou et al. | 364/606 |
| 5,363,403 | 11/1994 | Schilling et al. . | |
| 5,481,533 | 1/1996 | Honig et al. | 375/205 |
| 5,790,590 | 8/1998 | Shou et al. | 375/200 |

FOREIGN PATENT DOCUMENTS

| | | |
|---|---|---|
| 0491668 | 6/1992 | European Pat. Off. . |
| 0493904 | 7/1992 | European Pat. Off. . |
| 0606546 | 7/1994 | European Pat. Off. . |

OTHER PUBLICATIONS

Tanaka et al., "Development of Low Power Consumption LSI for SS Communication", IEICE, SST95–77 (1995–10).

Ogawa et al., "Development of 1 Chip SS Communication LSI Using Digital Matched Filters", IEICE, SST94–42, (1994–12).

Dual 64–TAP, 11 Mcps Digital Matched Filter/Correlator Stel–3310, Stanford Telecom, pp. 125, 126, 130 and 136.

Tachika, "A Development Conditions and its Technical Issue of Digital Matched Filters in Spread–Spectrum Communication Systems", SST92–21, Comm. Sys. Develop. Lab., Mitsubishi Electric Group.

Sawahashi et al., "Low Power Consumption Matched Filter LSI for Wideband DS–CDMA", IEICE, RCS95–120, (1996–01).

*Primary Examiner*—Jeffery A. Hofsass
*Assistant Examiner*—Rafael A. Perez-Pineiro
*Attorney, Agent, or Firm*—Pillsbury Madison & Sutro LLP

[57] ABSTRACT

A multi-user demodulator eliminates synchronization problems without interference cancellation. A threshold process is applied to a despread signal to extract each user's signal. The extracted signals are respread, and those respread signals other than a specifier user's signal are subtracted from the received signal to ideally extract the specific user's signal.

20 Claims, 25 Drawing Sheets

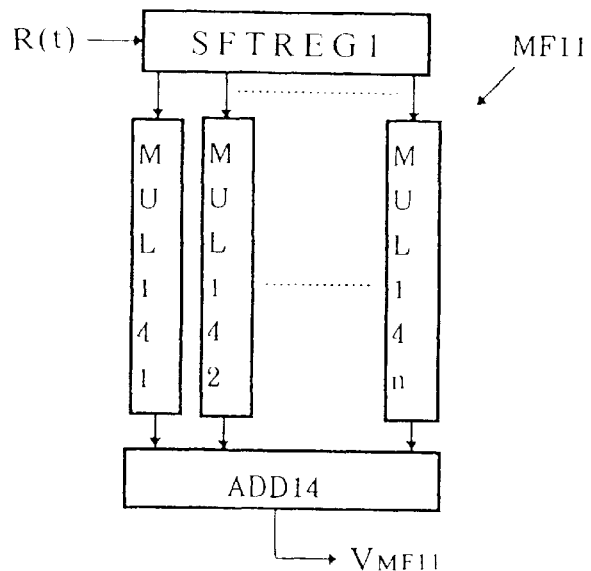
*F I G . 1 5*
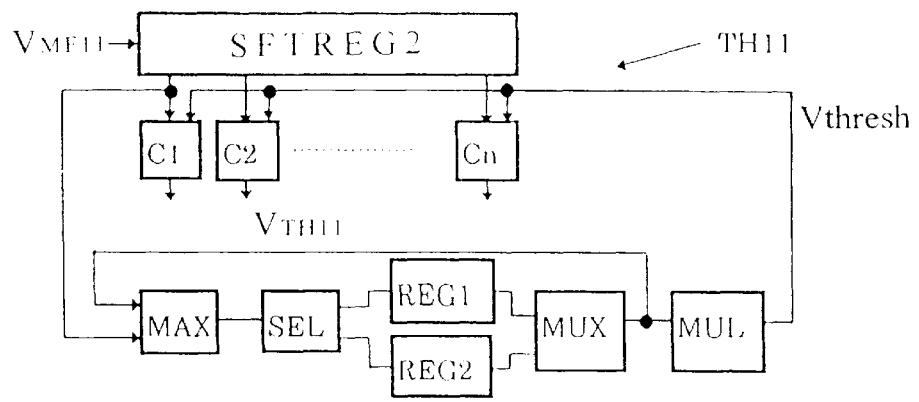
*F I G . 1 6*
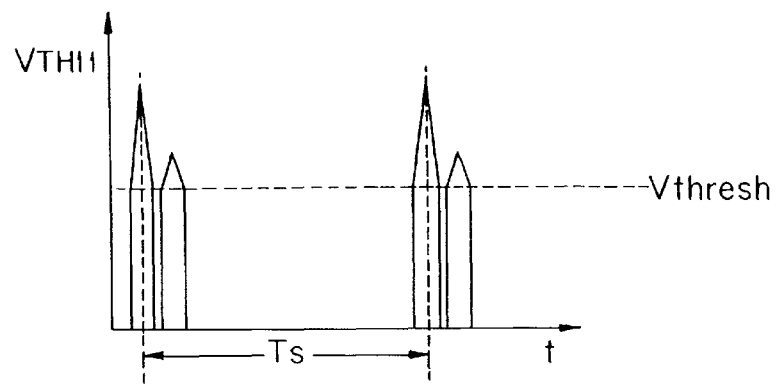
*F I G . 1 7*

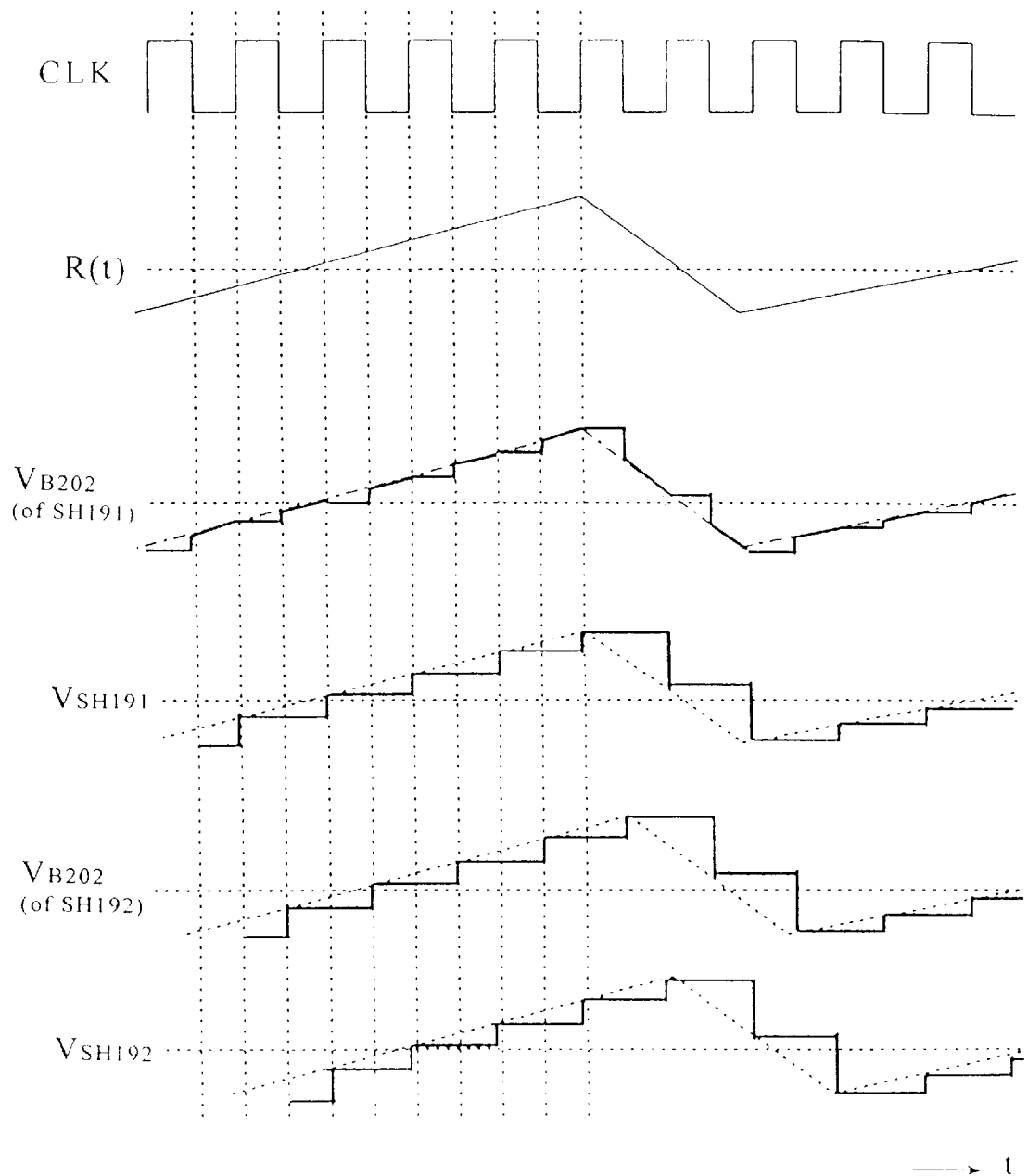
F I G . 2 4

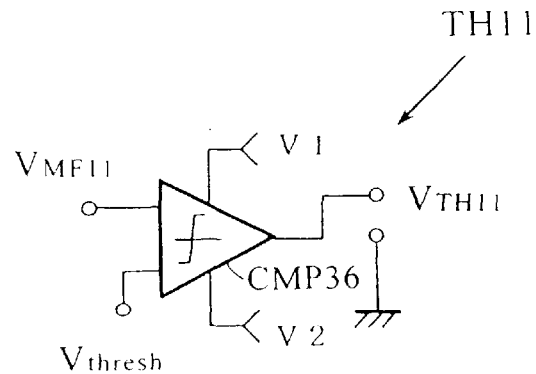
F I G . 3 7
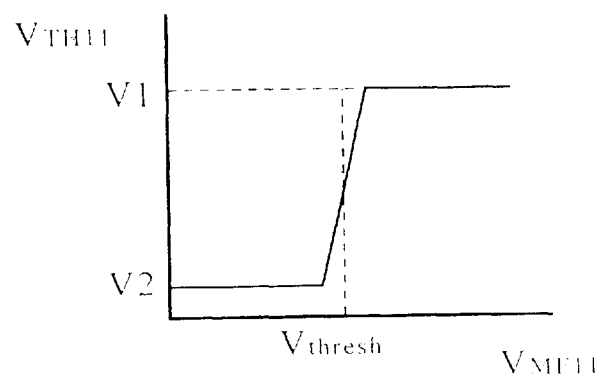
F I G . 3 8
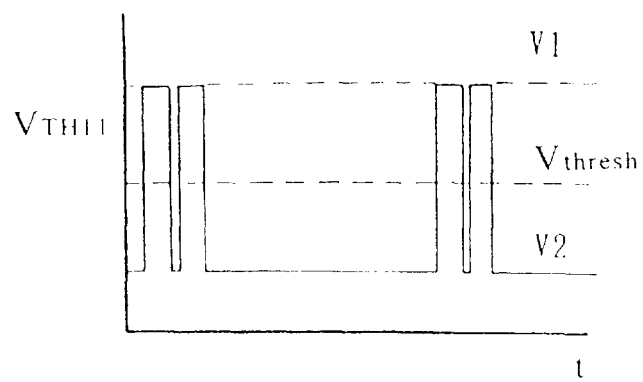
F I G . 3 9

MULTI-USER DEMODULATOR FOR CDMA SPECTRUM SPREADING COMMUNICATION

This invention claims a priority based on a patent application, 8-021869 filed in Japan, the content of which is incorporated hereinto by reference.

BACKGROUND OF INVENTION

1. Field of Invention

This invention relates to a base station, a multi-user demodulator, and a demodulating method for the base station, which communicates with a plurality of user stations by DS-CDMA (Direct Sequence-Code Division Multiple Access) spectrum spreading communication method.

2. Related Art

In DS-CDMA spectrum spreading communication, a base station receiver receives signals from a plurality of users, separates and extracts each of individual user's signal from the received signals, accounting for interference among signals, and despreads the extracted signal. To despread the signal, a sliding correlator performs corrleation. The sliding correlator requires accurate phase-synchronization between the spreading code of the input signal and the spreading code of the receiver. Therefore, a synchronization detecting and tracking circuit, such as a DLL (Delay Locked Loop) circuit, is necessary. However, the DLL circuit has a disadvantage that the initial and subsequent leading times are long. Moreover, since it is difficult to synchronize accurately even with the DLL circuit, receiving characteristics are deteriorated.

To prevent interference among multiple user signals, interference cancellation is used. The interference canceler reproduces each user signal by despreading and recomposing the received signal, and by respreading its spectrum. The interference canceler further extracts a specific user's signal by subtracting other users' signals from the received signal. These processes required fairly large and expensive circuits.

Therefore it is an object of the present invention to overcome the above disadvantages, and to provide a multi-user demodulator and demodulation method that lacks the synchronization problems associated when there is no interference canceler. It is also an object of the present invention to provide a base station for communicating with a plurality of users using the demodulator.

SUMMARY OF INVENTION

To achieve the above objects, the multi-user demodulator of the present invention extracts each user signal by despreading the received signal and processing the despread signal with a threshold to extract each user's signal. The multi-user demodulator further spreads each extracted user's signal, and subtracts other users' respread signals from the received signal to produce a specific user's signal clearly.

The despreading circuit of the present invention may include a matched filter comprising (a) analog sample holders having a capacitor and an inverse amplifier, (b) analog multiplexers that divide the output of the sample holders into two in response to the PN code, and (c) an adder that adds the outputs of the multiplexers by capacitance coupling. The received signal may be supplied to one of the sample holders through switches.

In such a multi-user demodulator, a plurality of first matched filters acquire correlation of a received signal with each respective user's spectrum spreading code assigned as a tap coefficient. A plurality of was extractors extract high voltage waves as dominant waves, from outputs of respective matched filters. A plurality of respreading circuits respread the spectrum of the dominant waves with the respective users' spectrum spreading codes. A delay delays the received signal by a predetermined period, and a first adder subtracts the outputs of the respreading circuits, other than a specific user's respread signal, from the output of the delay. A second matched filter despreads the spectrum of an output of the first adder with the spectrum spreading codes assigned to the specific user. A decision circuit determines and reproduces a user's signal. For example, when the received signal was modulated by a transmitter with QPSK, the decision circuit demodulates the QPSK given by the second matched filter to a binary signal.

BRIEF DESCRIPTION OF THE DRAWINGS

FIG. 15 is a block diagram showing an example of matched filter realized by a dedicated digital circuit.

FIG. 16 a block diagram showing an example of dominant wave extractor realized by a dedicated digital circuit.

FIG. 17 is output of the dominant wave extractor.

FIG. 24 is an operation timing of the first and second sample holders shown in FIG. 20.

FIG. 37 is an example of analog dominant wave extractor.

FIG. 38 is the input/output characteristic of the dominant wave extractor.

FIG. 39 is the output of the dominant wave extractor of FIG. 37.

DETAILED DESCRIPTION OF CURRENTLY EMBODIMENTS OF THE INVENTION

The currently preferred embodiments of the present invention will be described with reference to the drawings.

Figure 1:
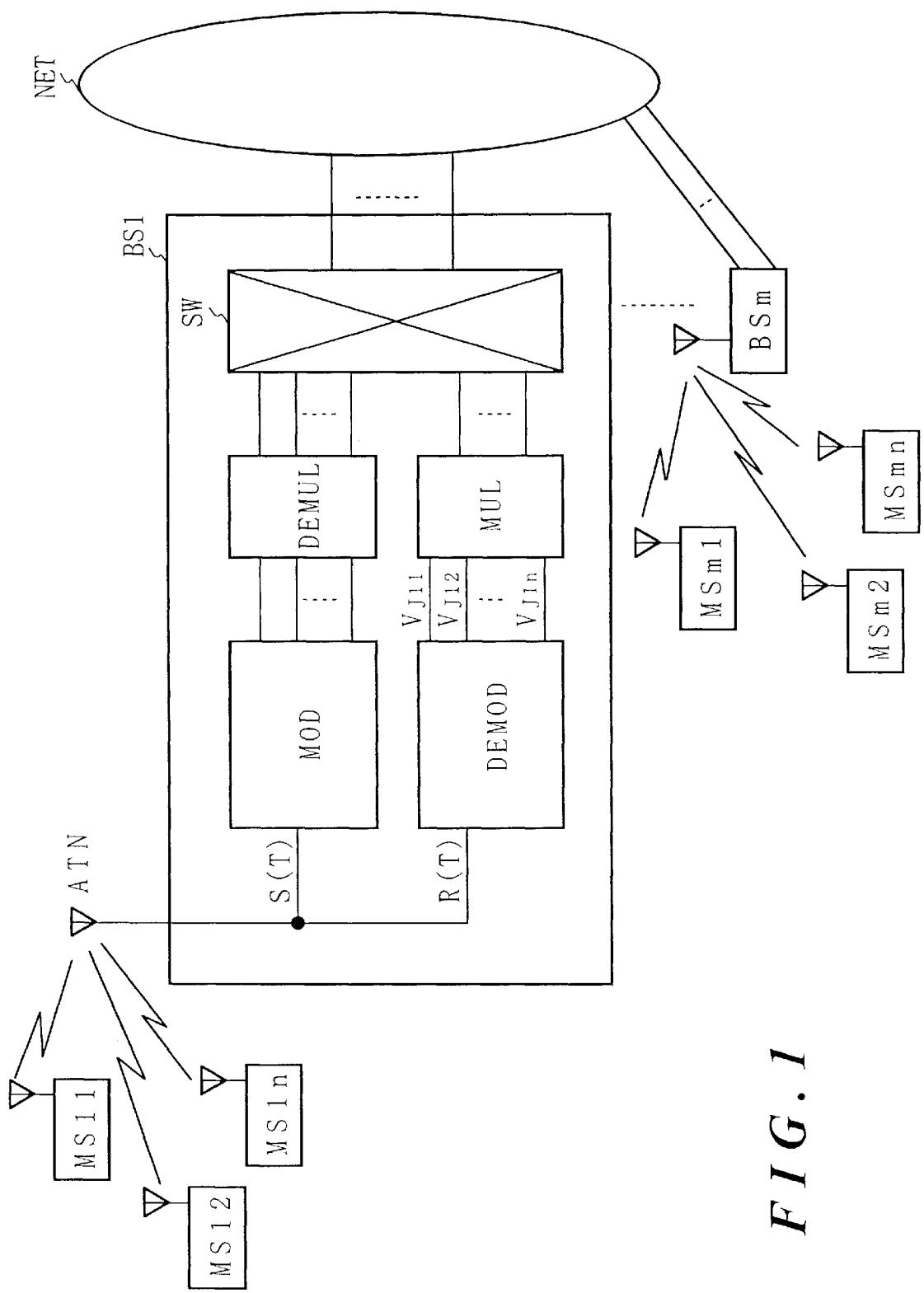
FIG. 1 is a CDMA communication system including a base station RS of the present invention.

FIG. 1 shows a CDMA communication system of the present invention. Base station BS receives a signal R(t), which includes CDMA spread signals of user stations MS11 to MS1n. The spread signals from the user stations MS11 to MS1n are spread with different PN codes. A multi-user demodulator DEMOD of the base station BS1 demodulates the received signal R(t) and outputs despread user signals $V_{J11}$ to $V_{J1n}$ of the user stations MS11 to MS1n. A multiplexer MUL multiplexes despread user signals $V_{J11}$ to $V_{J1n}$ and sends the signal to the network NET through network switch SW. A demultiplexer DEMUL separates each user's signal received through the network NET and the network switch SW. A modulator MOD modulates the user's signals and sends them to the user stations MS11 to MS1n through the antenna ATN.

Figure 2:
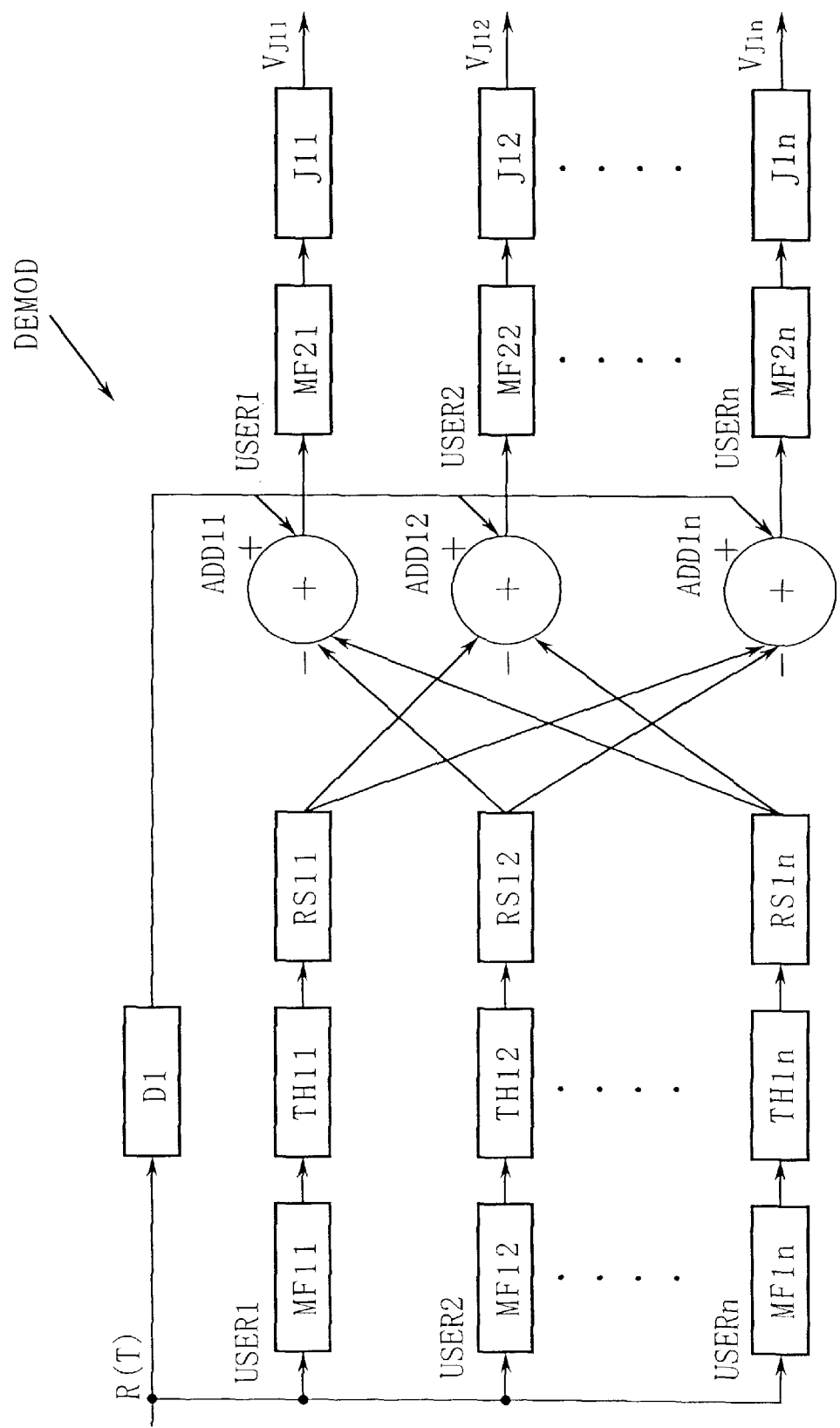
FIG. 2 is a block diagram of a demodulator of the base station.

FIG. 2 illustrates an example of the multi-user demodulator DEMOD in FIG. 1. Matched filters MF11 to MF1n (collectively referred to as MF1) despread the received signal R(t) to extract the corresponding user's signal. The extracted user's signal has been distorted in the transmission path. In addition, the received signal contains thermal noise. Suppose that the user's signal with the transmission path distortion is Ii(t), the signal level is "ai," spreading code of each user is PNi, and thermal noise is n(t), then the received signal R(t) is expressed as follows:

$$R(t) = a1 \cdot PN1 \cdot I1(t) + a2 \cdot PN2 \cdot I2(t) + \ldots + an \cdot PNn \cdot In(t) + n(t) \quad (1)$$

Figure 3:
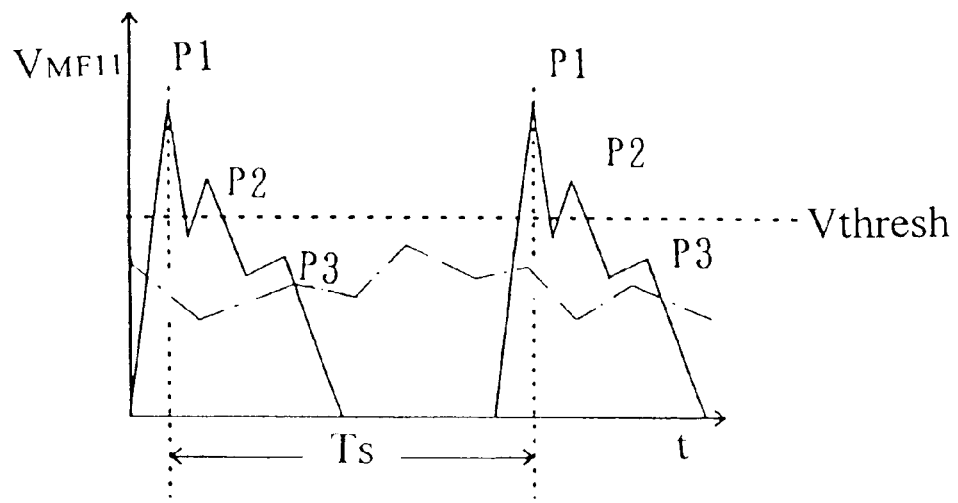
FIG. 3 shows matched filter output $V_{MF11}$ according to a first embodiment.

FIG. 3 shows the output $V_{MF11}$ of the matched filter MF11 by a solid line. The output $V_{MF11}$ has its peaks P1, P2, and P3 in each cycle (i.e., each symbol time Ts). The solid line voltage is obtained by correlating the first user spreading code, the first term of formula (1) and the thermal noise term of formula (1). On the other hand, the dotted broken line indicates an interference voltage resulting from correlation between the first user spreading code and the sum of the second through n-th terms of formula (1).

In the DS-CDMA method, each user is generally assigned a high orthogonal spreading code that has low correlation with others and causes a low interference wave. However, when many users are communicating with the base station BS, the interference wave level rises as shown in FIG. 3, and it is difficult to demodulate accurately. To overcome this interference problem, outputs $V_{MF11}$ to $V_{MF1n}$ of the matched filters MF11 to MF1n are respectively input to the dominant wave extractors TH11 to TH1n (collectively referred to as TH1) which remove interference waves and thermal noises, and extract only the dominant wave based on a threshold.

Figure 4:
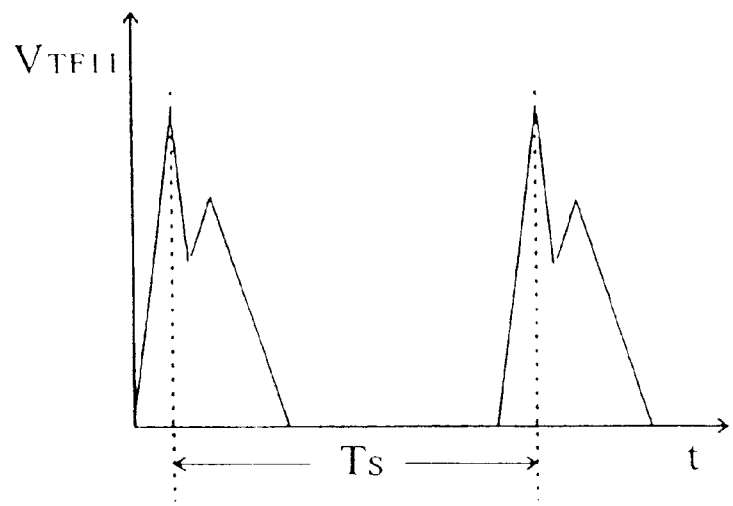
FIG. 4 shows the output voltage of the desired wave.
Figure 41:
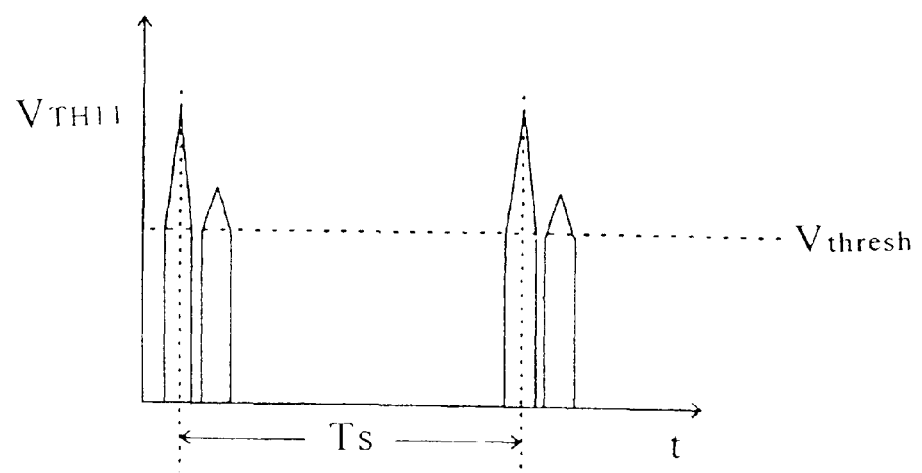
FIG. 41 is the output of the dominant wave extractor of FIG. 40.

FIG. 4 shows an output of the extractor TH11 which processed the input $V_{MF11}$ shown in FIG. 3. Conceptually, among peaks P1 to P3 in FIG. 3, peak P3, which is lower than the predetermined threshold level $V_{thresh}$, is eliminated. However, in the actual process, an input signal lower than the threshold level $V_{thresh}$ is converted to a certain low level output as shown in FIGS. 39 and 41.

In FIG. 1, each of the dominant wave extractors TH11 to TH1n processes the input signal with a threshold, which is obtained by multiplying the peak voltage having a maximum power within one symbol time by a predetermined ratio. The outputs $V_{TH11}$ to $V_{TH1N}$ from the dominant wave extractors TH11 to TH1n are input to the respreading circuits RS11, RS12, ..., RS1n (collectively referred to as RS1), and respread. The respread outputs VRS11 to VRS1n from the respreading circuits RS1 are replica signals that approximate to the respective user signals. For example, output $V_{RS11}$ from RS11 is a replica signal of the first user's signal which will be used to extract other user's signals.

Adders ADD11 to ADD1n (collectively referred to as ADD1) input replica signals $V_{RS11}$ to $V_{RS1n}$ to produce despread signals of the respective users. More particularly, the adder ADD11 sums up the replica signals other than the i-th user signal, and subtracts the sum from the received signal R(t) to produce despread signals of i-th user. The received signal R(t) is delayed by a delay D1 to synchronize with the signals that passed through the matched filters MF1, dominant wave extractors TH1, and respreading circuits RS1. If the replica signal is ideal, that is, if only the i-th term of formula (1) is extracted, then the output of the adder ADD1i is a sum of the i-th user's spreading signal and thermal noise, as expressed by formula (2).

$$\begin{aligned}
Aouti &= R(t) - \{a1 \cdot PN1 \cdot I1(t) + a2 \cdot PN2 \cdot I2(t) + \ldots + \\
&\quad ai - 1 \cdot PNi - 1 \cdot Ii - 1(t)\} - \{ai + 1 \cdot PNi + 1 \cdot Ii + 1(t) + \ldots + \\
&\quad an \cdot PNn \cdot In(t)\} \\
&= ai \cdot Pni \cdot Ii(t) + n(t)
\end{aligned} \quad (2)$$

As is clear from formula (2), cross correctively, i.e., interference, is reduced by the adder ADD1.

Complex matched filters MF21 to MF2n (comprehensively referred to as MF2) input the extracted spread signals from adders ADD11 to ADD1n and perform correction to ideally extract despread signals $V_{MF21}$ to $V_{MF2n}$ of corresponding users. Decision circuits J11 to J1n determine and reproduce user signals. For example, when the received signal was modulated by a transmitter with QPSK, the decision circuit demodulates the QPSK signal given by the second matched filter to a binary signal. The advantage of the first embodiment will be shown through several examples of the matched filter MF11 and MF21 outputs when a multi-path does not exist.

Figure 5:
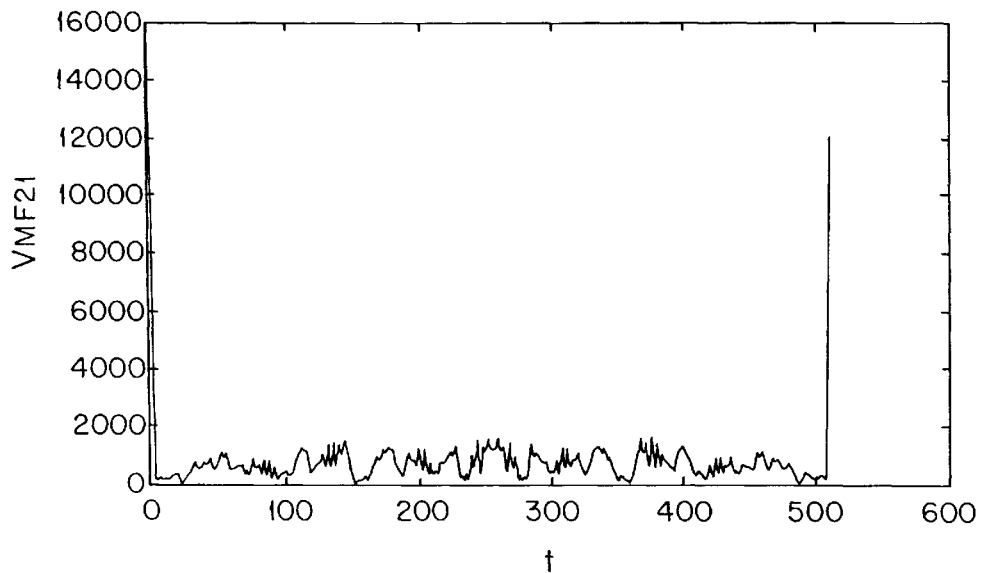
FIG. 5 shows matched filter output $V_{MF21}$ when the amount of interference is small.

FIG. 5 shows a simulation result of output $V_{MF21}$ of matched filter MF21 having almost no interference. This simulation is based on the static correlative operation within the base band, where primary modulation is QPSK, spreading code is 128 chips M sequence, over sampling number is four, and the number of user stations is two. In the figure, the correlation peak of the first user (desired station) is detected at time t=0. In the simulation, the signal energy to noise power ratio (Eb/No) is set to 100 dB, and the ratio of the desired wave electric power to interference wave electric power (D/U) is 100 dB. Thus, the influence of noise and interference is fairly small. The peak at t=512 is caused by the adjacent symbol, and has no relation with the impulse response of the transmission path.

Figure 6:
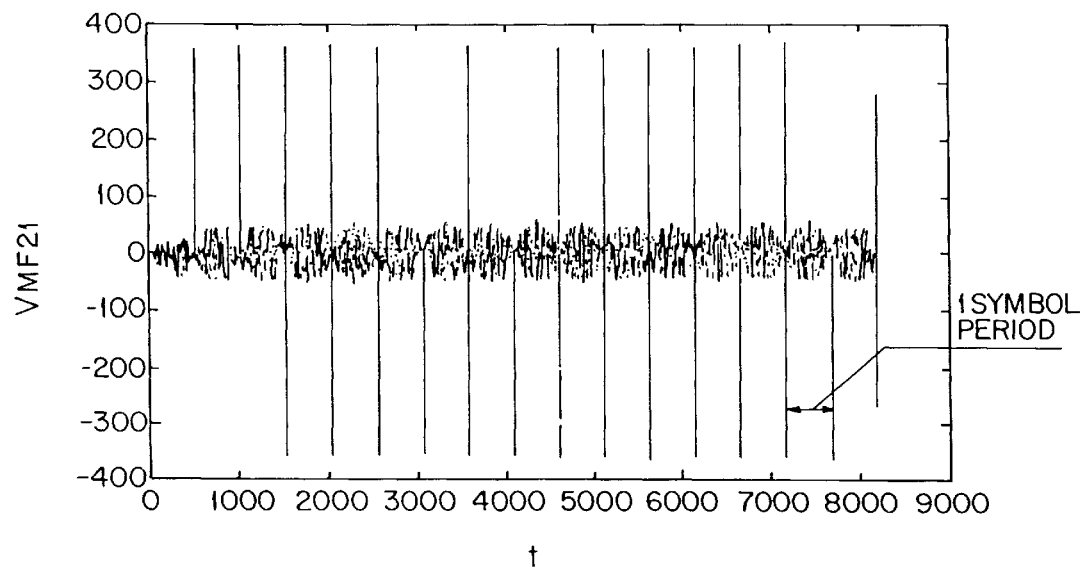
FIG. 6 shows matched filter output $V_{MF21}$ for longer periods, under the same conditions as in FIG. 5.

FIG. 6 shows the matched filter output $V_{MF21}$ of FIG. 5 for 16 symbol periods, in which both of real part (I-phase) and imaginary part (Q-phase) are indicated. When only one peak extends upward or downward, the I-phase and Q-phase have a same polarity. When the peak extends both upward and downward, the I-phase and Q-phase have different polarities. In such an ideal condition, distinctive peaks are generated without interference by other users.

Figure 7:
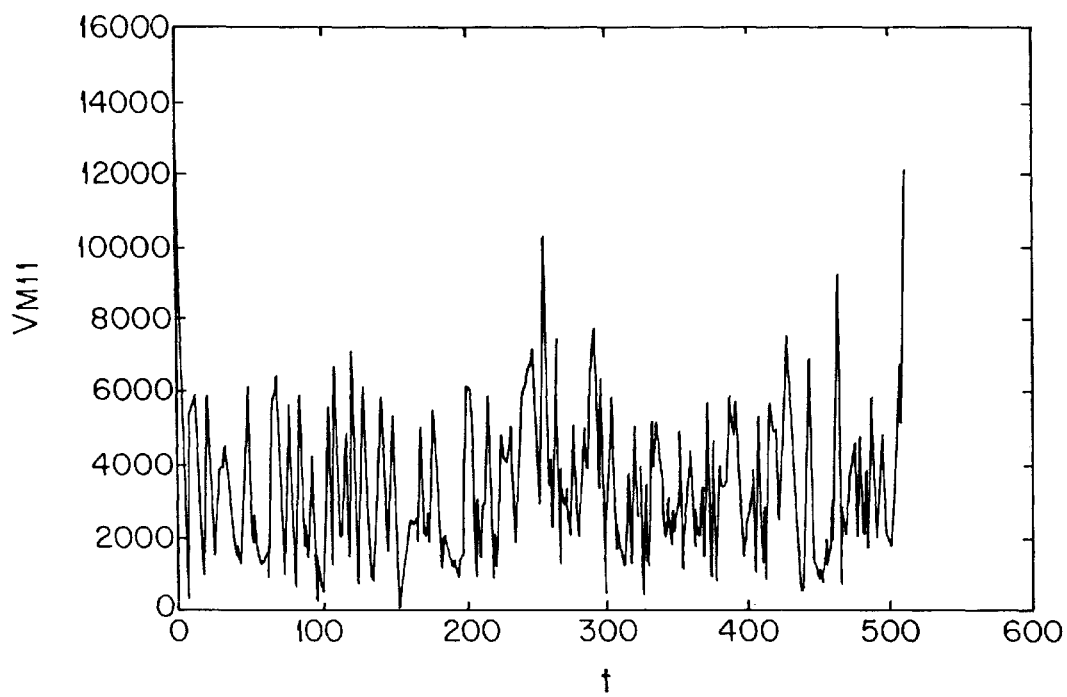
FIG. 7 shows output of the matched filter MF11 when several interfering stations exist.

FIG. 7 illustrates the simulation result of the output $V_{MP11}$ under the condition of D/U=–10 dB, that is, there are ten interfering stations other than the desired station, and the electric power of the desired wave is one tenth (1/10) of the electric power of the interference waves. In the chart, a high peak appears at t=270, in addition to the peak of the desired station generated at t=0. Since the interfering peak is affected by the cross correlation value, it appears at a different time when the spreading code varies. This causes error determination. Furthermore, the peak level of the desired station may be attenuated by the interfering peak, which also causes error determination.

Figure 8:
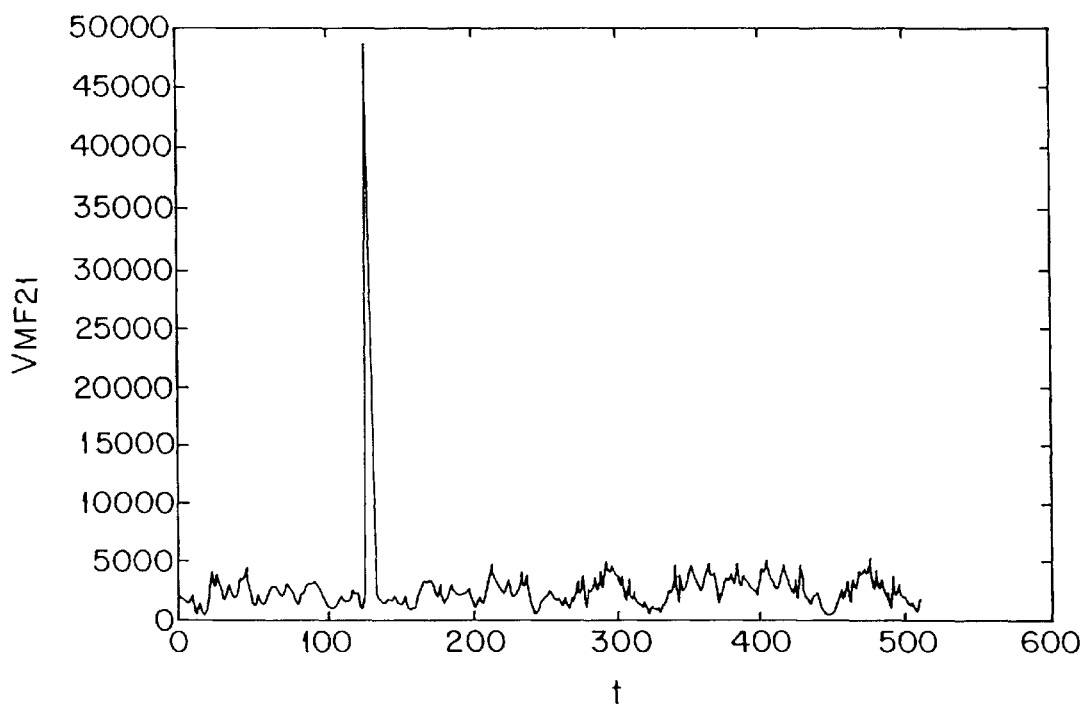
FIG. 8 shows output of the matched filter MF2i for an interfering station under the same conditions as in FIG. 7.

FIG. 8 shows output $V_{MF1i}$ of matched filter MF2i of an interfering station under the same conditions as an FIG. 7. A distinct peak of the interfering station is generated at t=128 more clearly than the peak of the desired station shown in FIG. 7. The peak is generated at t=128 because the station communicates by asynchronous CDMA, and the spreading codes given to the users in the same cell are not synchronized each other. In FIG. 8, as the worst condition, the spreading code phase of interference wave is shifted by 128 samples (i.e., 32 chips) where the cross correlation is worst.

Figure 9:
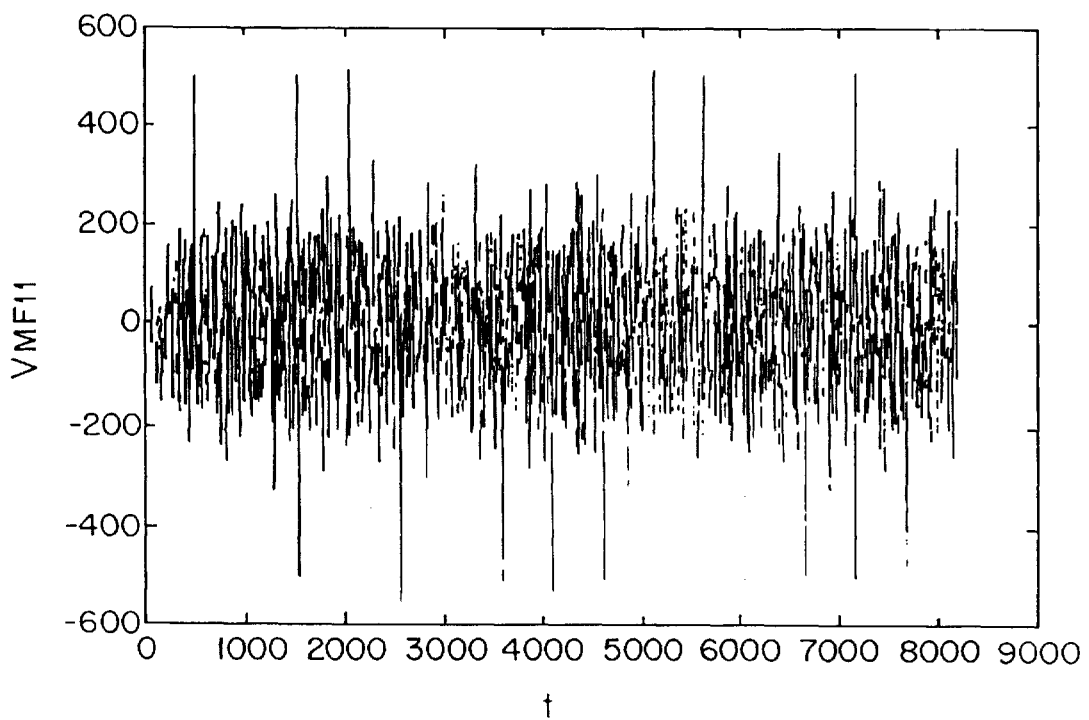
FIG. 9 shows output of the matched filter MF11 for a long period under the same conditions as in FIG. 7.

FIG. 9 illustrates the matched filter output $V_{MF11}$ of FIG. 7 for 16 symbol periods. As seen from the figure, the peak of the desired station, which should appear at t=0, is unstable and undetectable. Thus, the signal of the desired station can be buried, depending on the level of the cross correlation.

Figure 10:
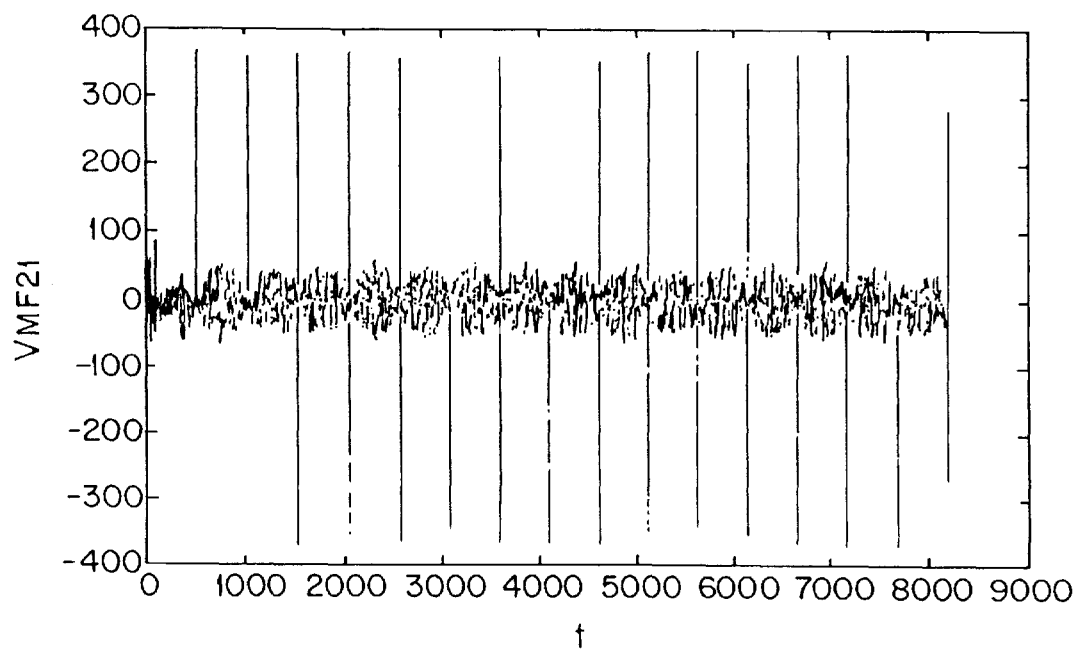
FIG. 10 shows output of the matched filter MF21 in which the interference wave has been removed from the received signal of FIG. 7 through the first embodiment of the invention.

FIG. 10 illustrates the output $V_{MF21}$ whose interference waves have already been removed by the processes explained in conjunction with FIG. 2. In this figure, peaks of the desired station appear stably like in FIG. 6 where no interference wave exists. By removing interference waves, peaks of the desired station can be reliably detected.

Figure 11:
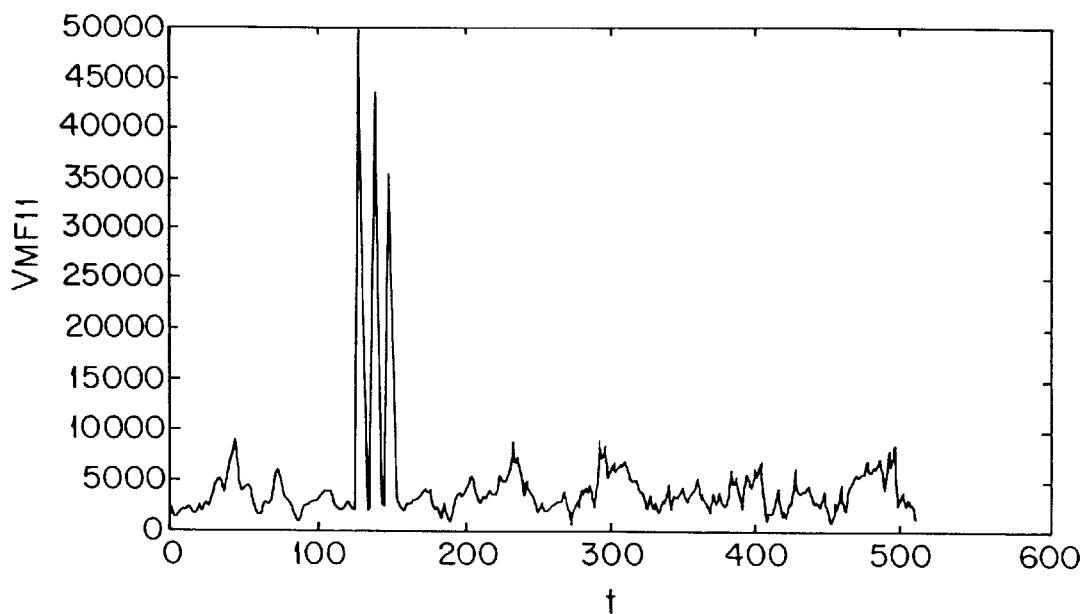
FIG. 11 shows output of the matched filter MF11 with regard to a multi-path signal.

FIG. 11 illustrates an output $V_{MF11}$ of the matched filter MF11 under the multi-path condition (three paths). Here, the impulse response of the transmission path is statically three paths. The direct wave from the desired station is generated at t=128, and the delayed waves are generated at t=138 and t=148. The gains of the respective paths are set to 1.0, 0.7, and 0.5.

Figure 12:
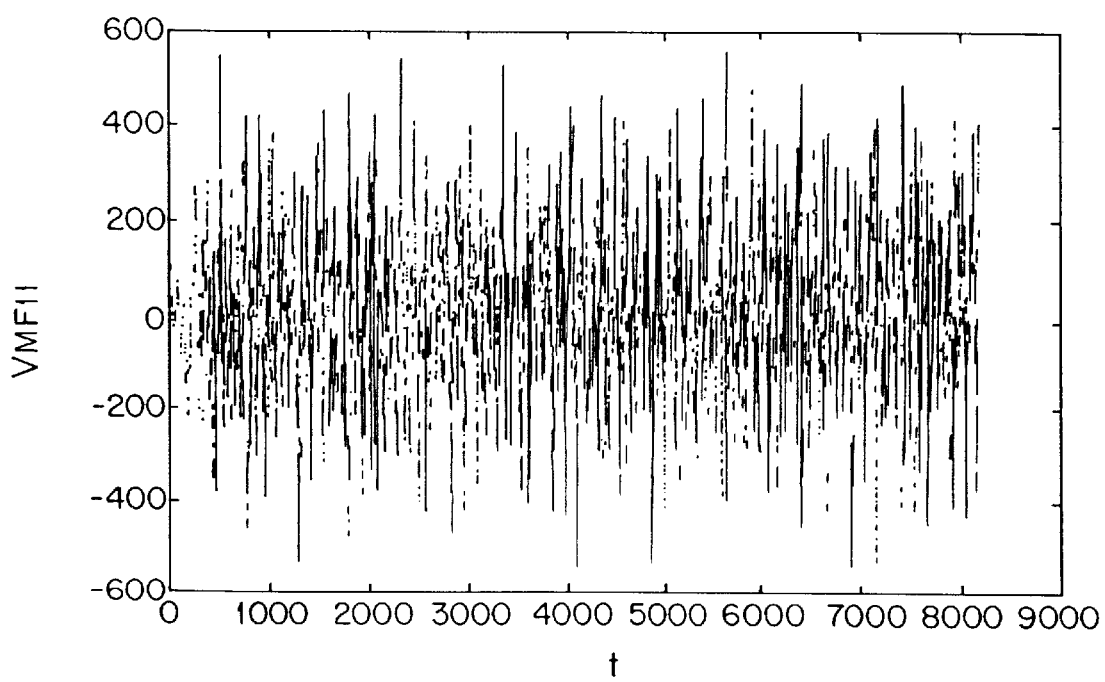
FIG. 12 shows output of the matched filter MF11 when interference wave affects the multi-path signal of FIG. 11.

FIG. 12 illustrates the output $V_{MF11}$ of the matched filter MF11 for 16 symbol periods, when the multi-path signals of FIG. 11 are received under the condition where the ration Eb/No=100 dB (Noise has almost no influence) and D/U=–10 dB (Interference waves from other stations are large). In this figure, the peak of the desired station can not be identified because of the interference waves.

Figure 13:
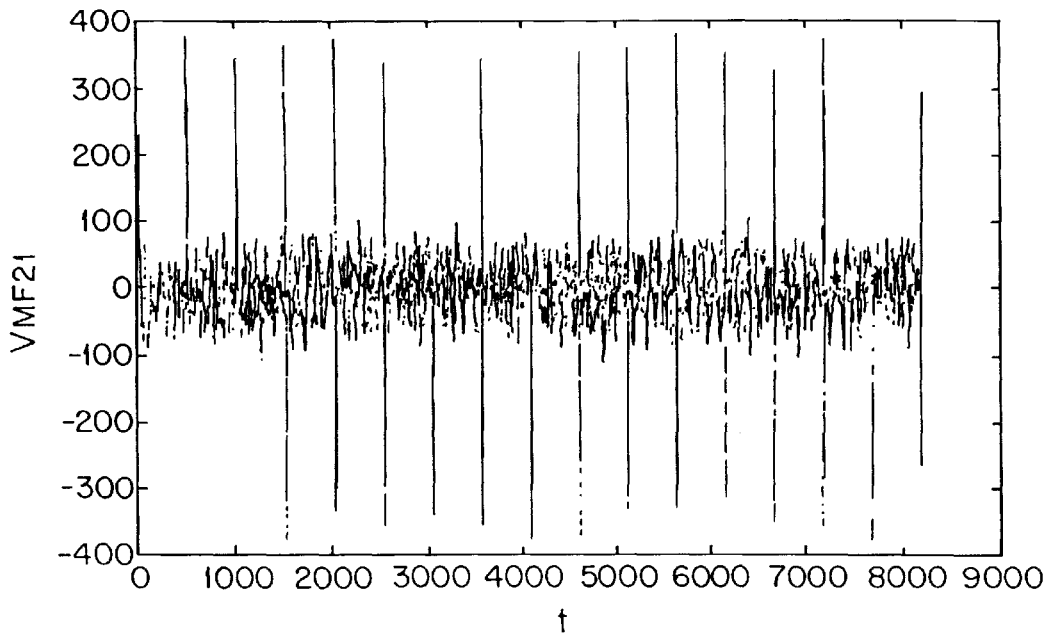
FIG. 13 is output of the matched filter MF21 in which the interference wave has been removed from the received signal of FIG. 12 through the first embodiment of the invention.

FIG. 13 illustrates the output $V_{MF21}$ of the matched filter MF21 under the same conditions as an FIG. 12. The output $V_{MF21}$ is obtained by cancelling the interference waves from other stations by the processes of FIG. 2. The direct wave from the desired station has a distinct peak, which can be detected reliably.

Figure 14:
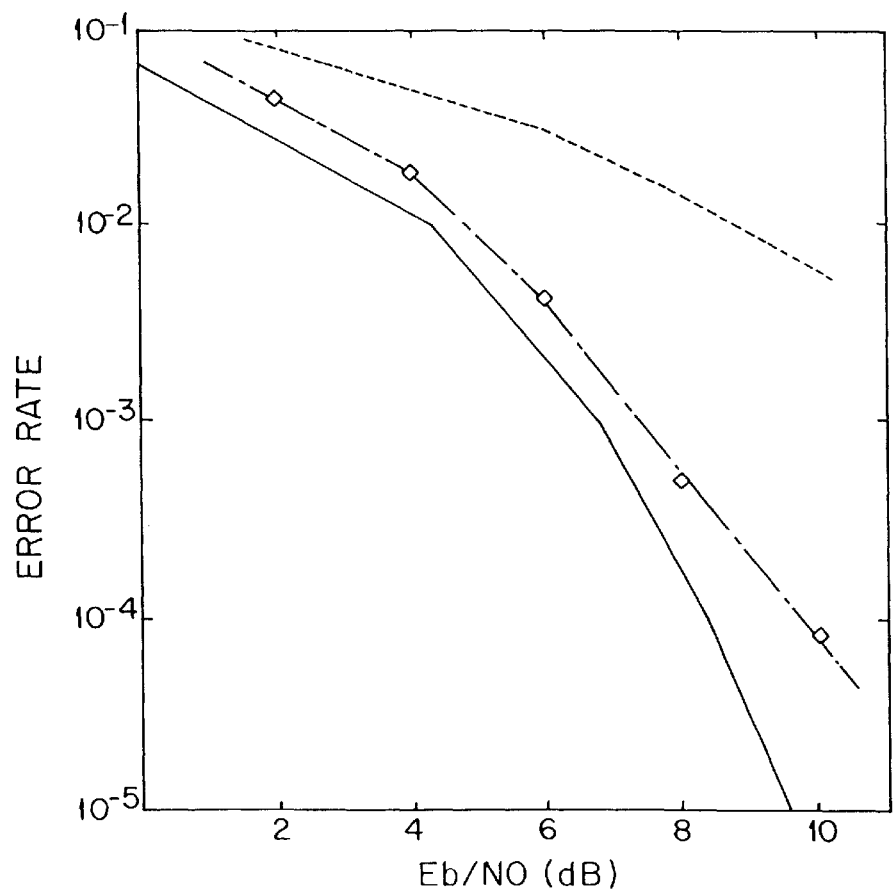
FIG. 14 shows a bit error rate according to the first embodiment of the invention compared with a logical bit error rate and the bit error rate without removing interference wave.

FIG. 14 shows bit error rates with regard to the ratio Eb/No. Bit error rates of this embodiment are plotted by circular symbols and a dotted broken line. Bit error rates without interference cancellation are indicated by a dashed line. Logical bit error rates are indicated by a solid line. Without interference cancellation, the bit error rates are several to ten times greater than the present embodiment which approximates to the theoretical value.

The complex matched filters MF11 to MF1n, MF21 to MF2n, dominant extractors TH11 to TH1n, respreading circuits RS11 to RS1n, adders ADD11 to ADD1n, and decision circuits J11 to J1n can be provided as follows.
(1) The entire system can realized by software on a general-purpose computer.
(2) Only the matched filters that are high load for CPU are realized by DSP or dedicated digital circuits, and other parts are realized by computer software.
(3) The entire system is realized by DSP and dedicated digital circuits.
(4) Only the matched filters with high load for CPU are realized by analog circuits, and the other parts are realized by computer software.
(5) Only the matched filters are realized by analog circuits, and the other parts are realized by DSP or dedicated digital circuits.
(6) The entire system is realized by analog circuits.

To increase the process speed, the percentage of dedicated analog or digital circuits should be increased. In view of power consumption, analog circuits are more advantageous than digital circuits.

FIG. 15 shows the structure of matched filter MF11 (FIG. 2) as a dedicated digital circuit. The matched filter MF11 has an n-stage shift register SFTREG1 which inputs digitized received signal R(t). Each stage of the shift register SFTREG1 is connected to one of the multipliers MUL141 to MUL14n (collectively referred to as MUL14). Each of multipliers MUL14 has a PN code, and multiplies the received signal by the PN code. An adder ADD14 inputs and sums up outputs of the multipliers MUL14 to make the matched filter output $VMF_{MF11}$. Since the PN code is generally one bit, the multipliers MUL14 can be an AND gate, which passes each bit of the received signal. Matched filters MF12 to MF1n and MF21 to MF2n have the same structure as MF11.

FIG. 16 shows a dominant extractor TH 11 (FIG. 2) as a dedicated digital circuit. The dominant extractor TH11 includes a shift register SFTREG2 that holds matched filter output $V_{MF11}$ for one symbol period. Each stage of the shift register SFTREG2 is connected to one of the comparators C1 to Cn. The first stage of the shift register SFTREG2 is also connected to the maximizer MAX. The maximizer MAX also receives feedback data from multiplexer MUX. The output of the maximizer MAX is given to a register REG1 or REG2 through a selector SEL.

The multiplexer MUX selectively outputs the data from either REG1 or REG2. The maximizer MAX compares the data from multiplexer MUX with current data from the first stage of the shift register SFTREG2, and supplies with the larger value data to the "current register". When the multiplexer MUX outputs the register REG1 data, the register REG2 is the "current register". When the multiplexer MUX outputs the register REG2 data, the register REG1 is the "current register". In other words, data with the larger value of data is registered in REG1 and REG2, alternately. When the selector SEL is switched to the "current register", the multiplexer MUX is also switched to another register.

The output of multiplexer MUX is connected to multiplier MUL, which multiplies the maximum value by a predetermined rate to obtain a threshold voltage $V_{thresh}$. The threshold voltage is inputted to the comparators C1 to Cn, and compared with data from the respective stages of the shift register SFTREG2. The comparison result is shown in FIG. 17. The comparators output shift register data, which is equal to or higher than $V_{thresh}$ and round as it is and rounds down shift register data less than $V_{thresh}$ to 0V, thereby allowing extraction of the dominant wave.

Figure 18:
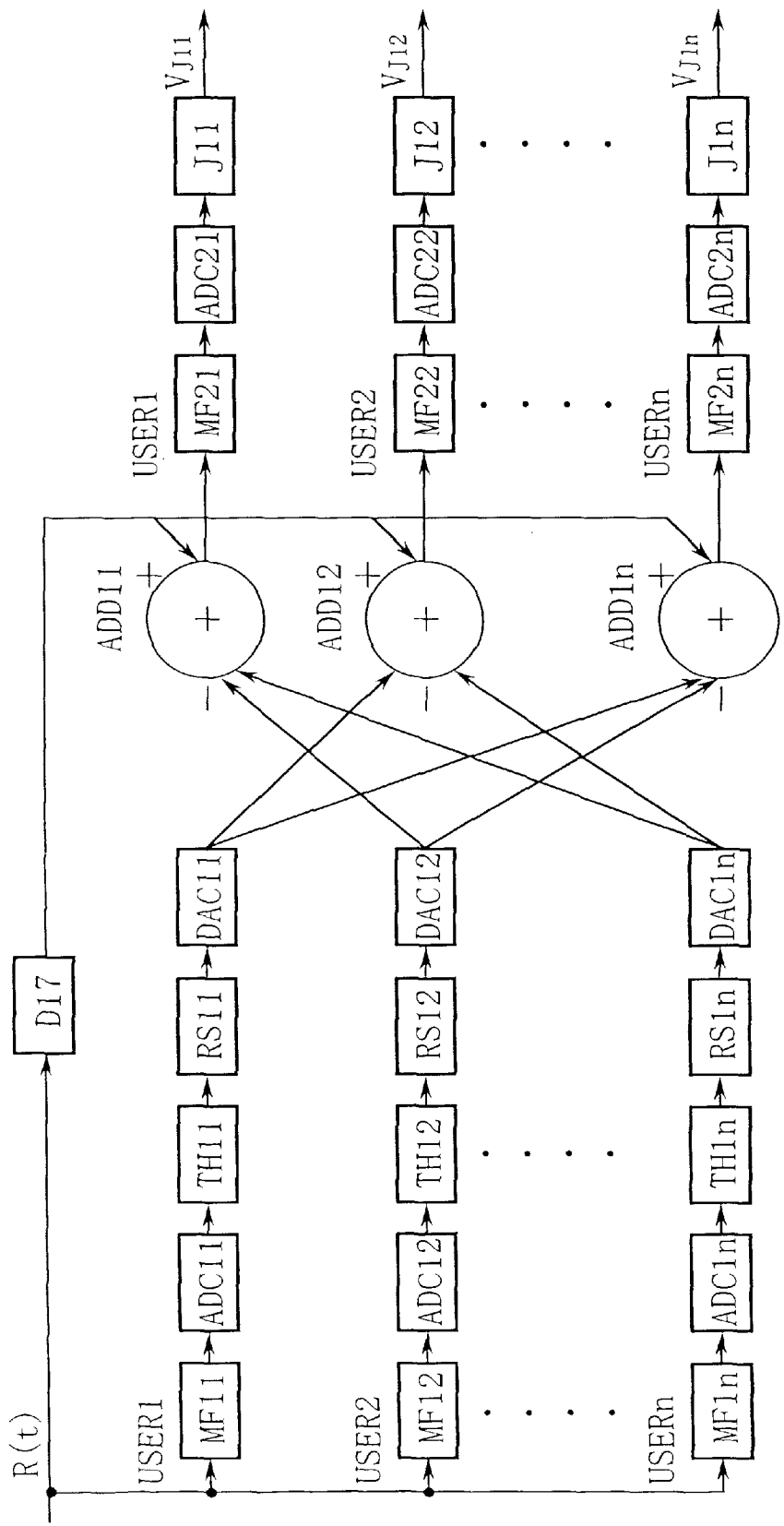
FIG. 18 is a block diagram of the demodulator according to a second embodiment in which analog matched filters are used.

FIG. 18 shows the structure of a demodulator according to a second embodiment of the invention. In this embodiment, dominant wave extractors TH1, respreading circuits RS1, and decision circuits J11 to J1n are dedicated digital circuits. Other elements are dedicated analog circuits. Received signal R(t) is input to analog matched filters MF11 to MF1n and analog delay D17. The output of the matched filters MF11 to MF1n are input to respreading circuits RS11 to RS1n through A/D converters ADC11 to ADC1n and dominant wave extractors TH11 to TH1n, respectively. The outputs of the respreading circuits RS11 to RS1n are input to adders ADD11 to ADD1n through D/A converters DAC11 to DAC1n. The adders ADD11 to ADD1n subtract the output of D/A converters DAC11 to DAC1n from the output of delay D17. The results are input to matched filters MF21 to MF2n, and are further supplied through A/D converters ADC21 to ADC2n to decision circuits J11 to J1n, respectively.

Figure 19:
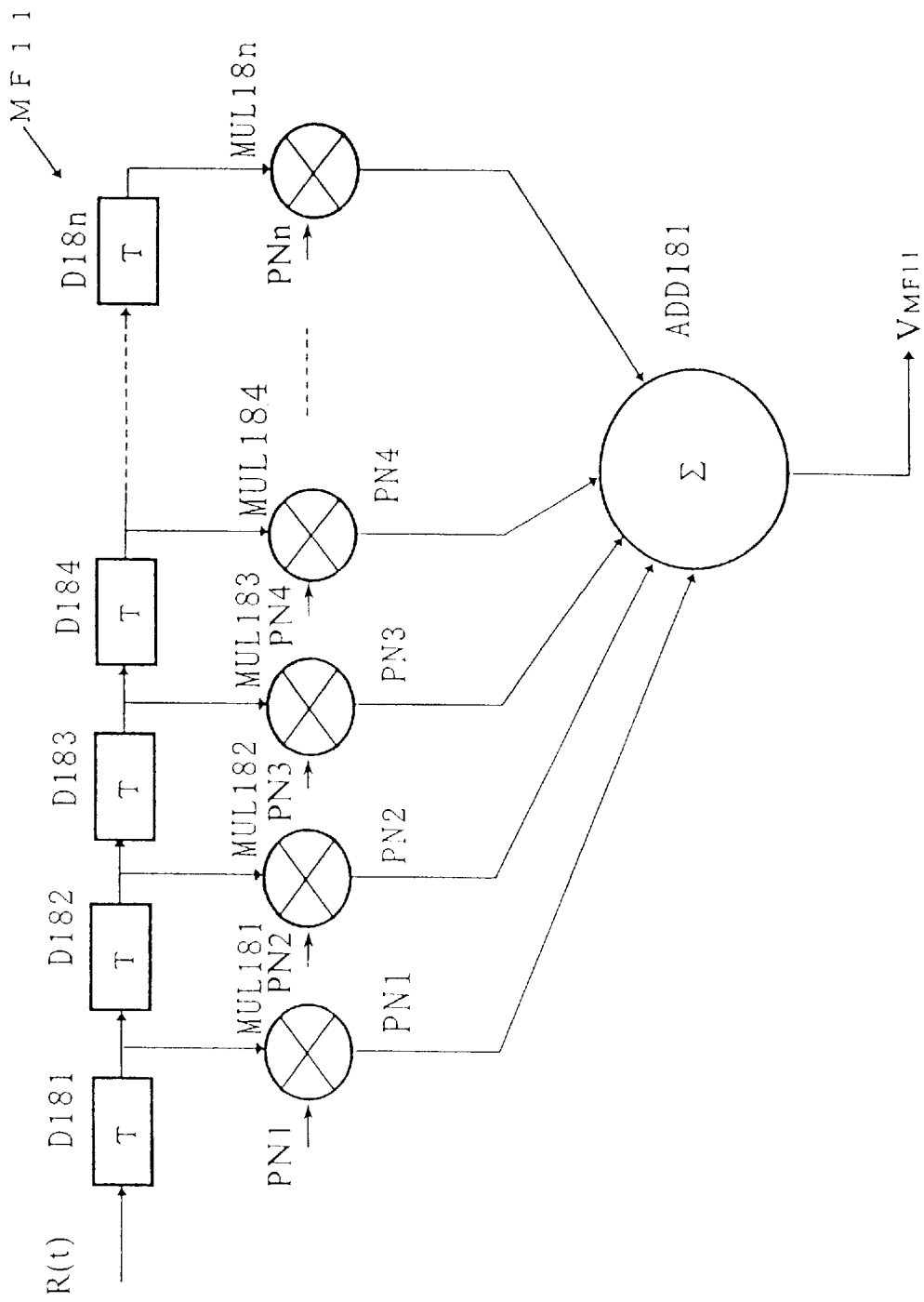
FIG. 19 is a block diagram of the analog matched filter of FIG. 18.

FIG. 19 shows the detailed structure of the analog matched filter MF11 of FIG. 15. In the matched filter MF11, a plurality of analog delay circuits D181, D182, ..., D18n are connected in series. Received analog signal R(t) is transferred from the first delay circuit to the later stage in sequence, and reaches the last delay D18n. The delay circuits are connected to analog multipliers MUL181 to MUL18n respectively, which multiply the received signals by PN codes PN1, PN2, ..., PNn, respectively. The outputs of the multipliers MUL181 to MUL18n are input to an adder ADD181 and summed up. Supposing that the delay through delay circuits D181 to D18n is Tc, the matched filter MF11 operates as follows.

$$V_{MF11} = \sum_{i=1}^{n} PNi \cdot R(t - i \cdot Tc) \quad (3)$$

Matched filters MF12 to MF1n and MF21 to MF2n have the same structure as the matched filter MF11 and their explanations are omitted.

Figure 20:
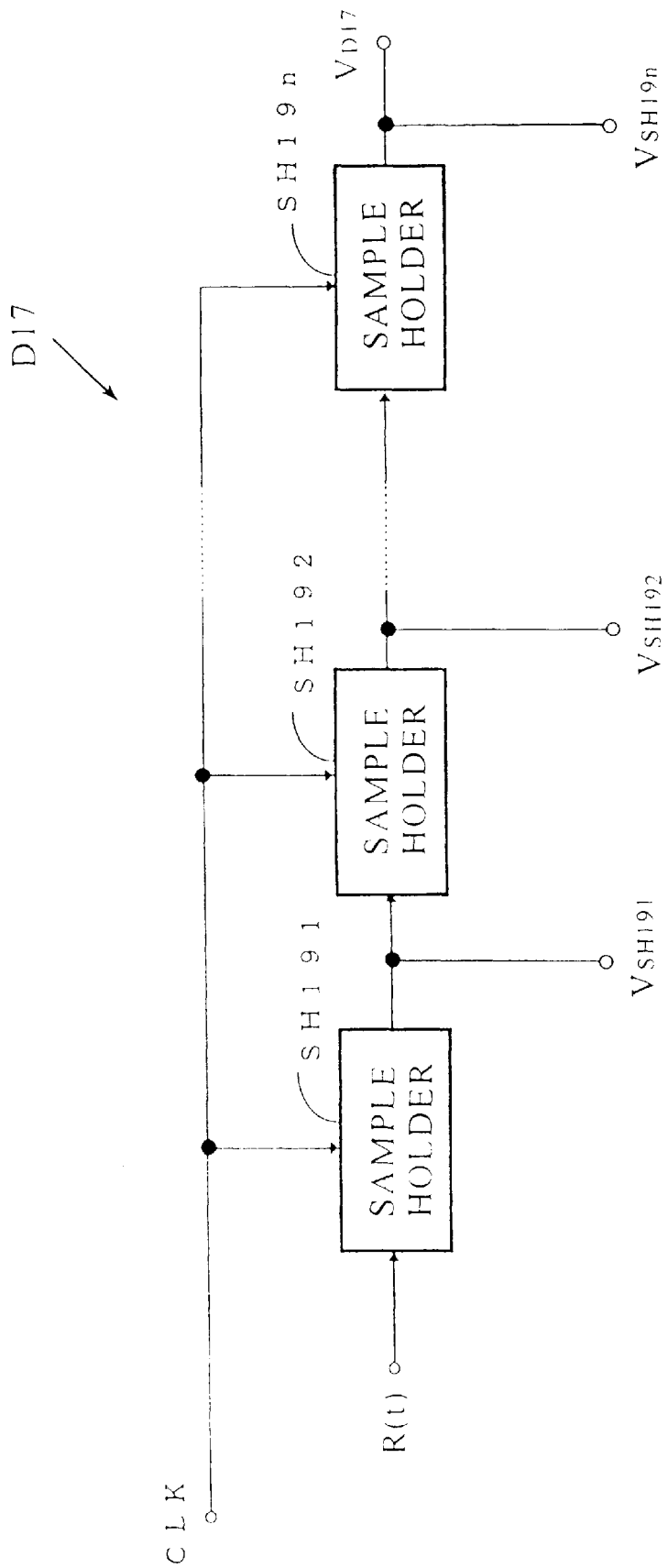
FIG. 20 is a block diagram of the delay circuit of FIG. 18.

FIG. 20 shows the structure of delay D17 of FIG. 18. The delay D17 has a plurality of sample holders SH191 to SH19n (collectively referred to as SH19) connected in series. The received signal R(t) is input to the first sample holder SH191 and fed to the latter stage in sequence. Each of sample holders SH19 samples and holds data in response to clock CLK. The number of the sample holder stages and the clock phase (timing) are set so that the output of the delay circuit $V_{D17}$ synchronizes with the received signal R(t) supplied to the adders ADD11 to ADD1n through matched filters MF11 to MF1n, dominant wave extractors TH11 to TH1n, and respreading circuits RS11 to RS1n. Delay D17 also functions as a shift register, and outputs $V_{SH191}$ to $V_{SH19n}$ from the respective sample holders which can be used as received data. The analog delay circuits D181 to D18n in FIG. 19 have the same block structure as delay D17 of FIG. 20 and their explanations are omitted.

Figure 21:
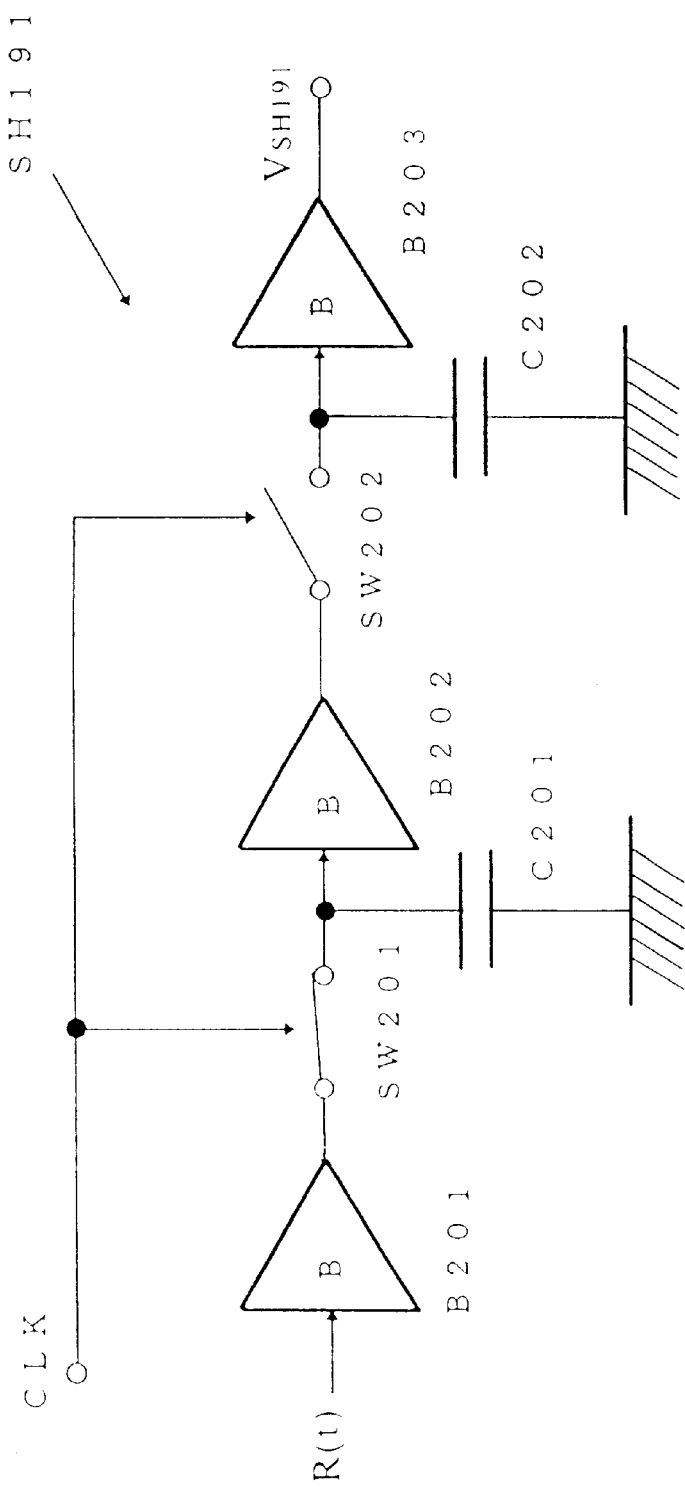
FIG. 21 is a circuit of the sample holder of FIG. 20.

FIG. 21 shows a sample holder SH191 of FIG. 20 in which buffer B201, switch SW201, buffer B202, switch SW202, and buffer B203 are connected in series in that order. Ground capacitors C201 and C202 are connected to the switches SW201 and SW202, respectively, at the later stage. Buffer B201 inputs the received signal R(t) and outputs the voltage $V_{B201}$ having the same level as the signal R(t), regardless of the output load. When the switch SW201 is closed, ground capacitor C201 is charged or discharged to the level of the output voltage $V_{B201}$ of the buffer B201. In other words, the sampled voltage is maintained by capacitor C201 for a predetermined period. When the predetermined period has passed, switch SW201 opens to hold the inputted voltage.

The buffer B202 inputs the voltage held by the capacitor C201 and outputs the same level stably. At this time, switch SW202 is closed and capacitor C202 is charged or discharged to the output voltage of the buffer B202. The buffer B203 inputs the voltage held by the capacitor C202 and outputs the same as stable output $V_{SH191}$. Switches SW201 and SW202 are closed alternately in a predetermined timing, and the received signal R(t) is successively transmitted to and held by the capacitors C201 and C202. The voltage supplied to the capacitor C202 is not affected by the input voltage R(t) until the switch SW202 is closed again, thereby generating a stable output voltage $V_{SH191}$. Buffer B201 is preferably a voltage follower type buffer or an inverse buffer.

Figure 22:
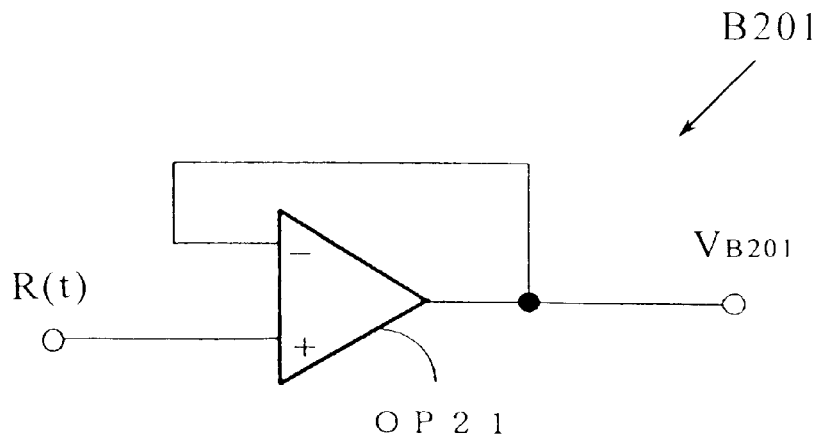
FIG. 22 is a circuit of the first example of the buffer shown in FIG. 21.

FIG. 22 shows the buffer B201 of voltage follower type. The input R(t) is connected to the non-inverted input of the operational amplifier OP21, and the output voltage $V_{B201}$ is fed back to the inverted input. In this circuit, the ratio of input and output is +1, and the input is rendered to output as it is.

Figure 23:
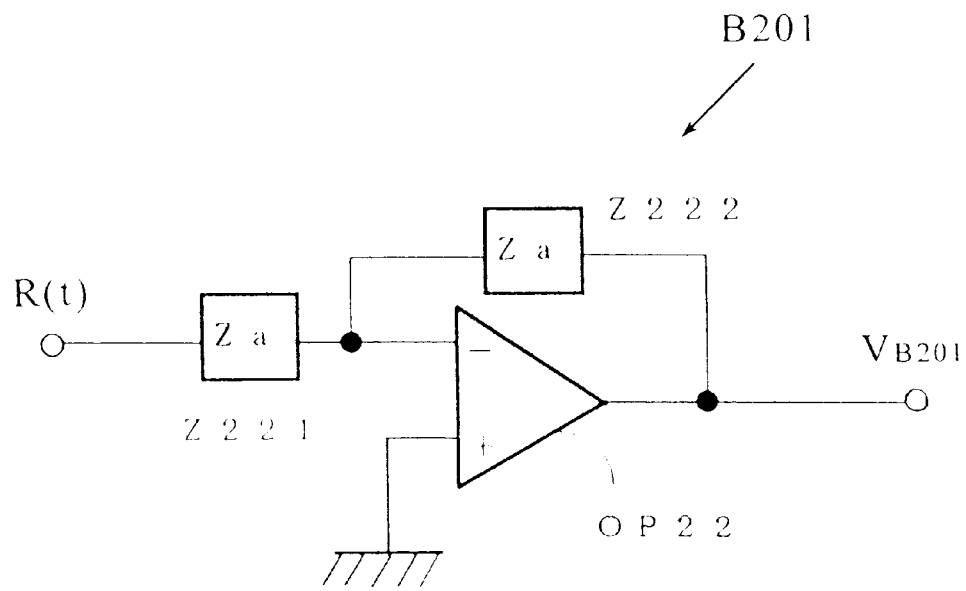
FIG. 23 is a circuit of the second example of the buffer shown in FIG. 21.

FIG. 23 shows the buffer B201 of inverse buffer type. The non-inverted input of the operational amplifier OP22 is grounded, and input R(t) is connected through an impedance Z221 to the inverted input of the operational amplifier OP22. The output of the operational amplifier OP22 is fed back as the inverted input to the operational amplifier OP22 through impedance Z222 which is equal to the impedance Z221. Output $V_{B201}$ of this circuit is equal to $-R(t)$. Since the sample holder SH191 outputs the input voltage through three stages of buffers B201, B202 and B203, the resultant output is inverted. If the delay D17 has an even number of sample holders, the output $V_{SH191}$ of the final buffer B201 has the same polarity as the input R(t). If the delay D17 has an odd number of sample holders, then an additional buffer must be added to the delay D17 invert the signal. Sample holders SH192 to SH19n have the same structure as SH191, and their explanation will be omitted.

FIG. 24 shows the operational timing of the sample holders SH191 and SH192. Input voltage R(t), output of the second buffer B202 of sample holder SH191 ($V_{B102}$ of SH191), output $V_{SH191}$ of the sample holder SH191, output of the second buffer B202 of sample holder SH192 ($VB_{202}$ of SH192), and output voltage $V_{SH192}$ of the sample holder SH192 are indicated in relation to clock CLK. When switch SW201 is closed (i.e., CLK is low) while the input R(t) is changing, the input R(t) appears as it is, as output $V_{B202}$ of buffer B202 of sample holder SH191. When the switch SW201 is open (i.e., CLK is high), the buffer output $V_{B202}$ is maintained constant until clock CLK becomes low again. Switch SW202 is closed when clock CLK is high, and successively generates a voltage held by capacitor C201 while the switch SW201 is open for a clock period. The generated voltage is output from buffer B203 as $V_{SH191}$.

The output $V_{SH191}$ from sample holder SH191 is input to the second sample holder SH192. The second sample holder SH192 holds the input voltage at a timing delayed by a half clock period through switch SW201, and generates a voltage further delayed by half clock period through switch SW202. This voltage is output from the sample holder SH192 as $V_{SH192}$. The analog delay circuit described above is small in size with a small power consumption compared with a digital circuit.

Figure 25:
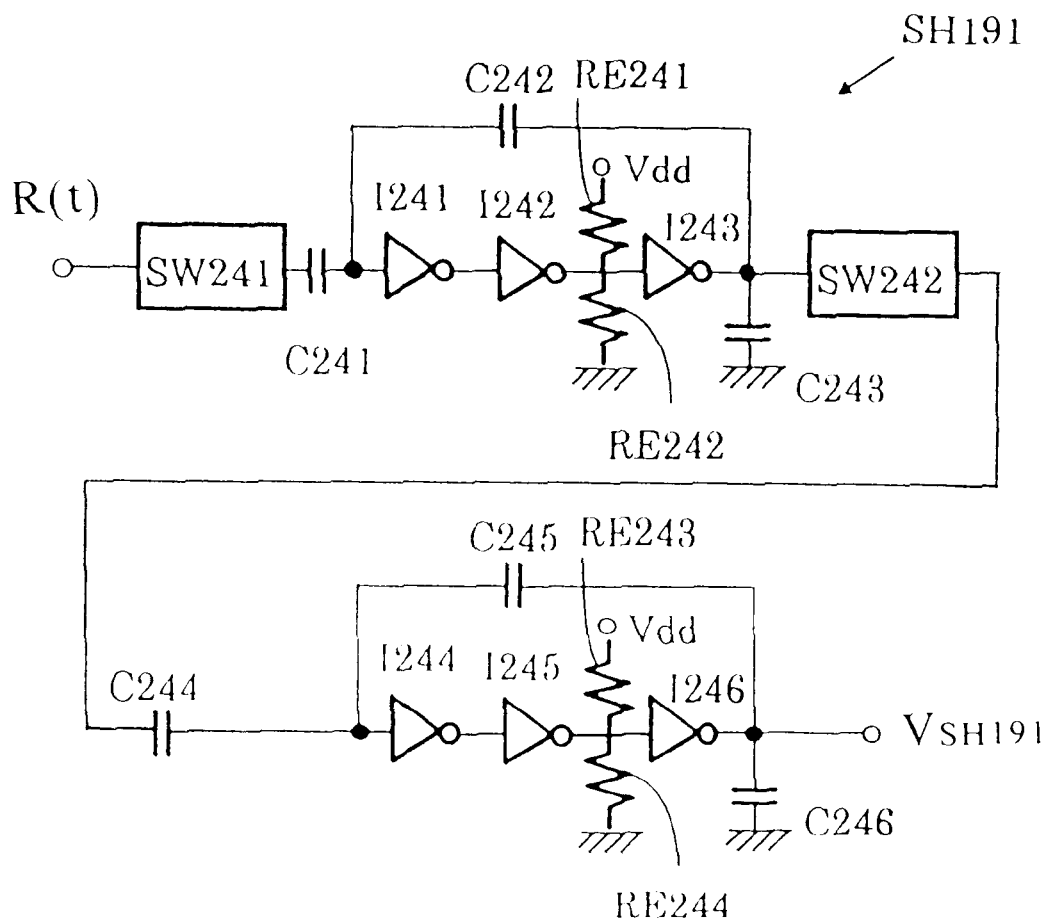
FIG. 25 is another example of a sample holder.

FIG. 25 illustrates another example of the sample holder SH191 of FIG. 20. This sample holder SH191 has three CMOS inverters I241, I242, and I243 which works as same as the inverted buffers in FIG. 21. Output of CMOS inverter I243 is fed back to the CMOS inverter I241. The signal R(t) is also input to the CMOS inverter I241 through CMOS switch SW241 and input capacitor C241.

When the switch SW241 is closed and then released again, capacitor C241 is charged or discharged to the level of the input R(t). The capacitance of C242 is set to equal to the capacitance of C241, and the three inverters I241 to I243 output the voltage held by the capacitor C241 as it is, as the output of the inverter I243. The output of inverter I243 is connected to the input of the CMOS switch SW242. Similar to the sample holder of FIG. 21, the input voltage is held and output by the closing and opening control of SW241 and SW242. The output of switch SW242 is further input through capacitor C244 to three CMOS inverters I244, I245 and I246 which are similar to the inverters I241 to I243, thereby matching the polarity of the input and output of the sample holder SH191. The output of the CMOS inverter I246 is connected to the input of I244 through feedback capacitor C245.

Outputs of the last MOS inverters I243, I246 are connected to ground capacitors C243, C246, respectively, which function as low pass filters. Outputs of the second inverters are connected to a pair of resistors RE241 and RE242, and another pair of resistors RE243 and RE244, respectively. The resistors RE241 and RE243 are connected to the power source Vdd, while the resistors RE242 and RE244 are grounded to control the gain of the three-stage inverters. These circuits prevent the oscillation of the three-stage inverters having feedback.

Figure 26:
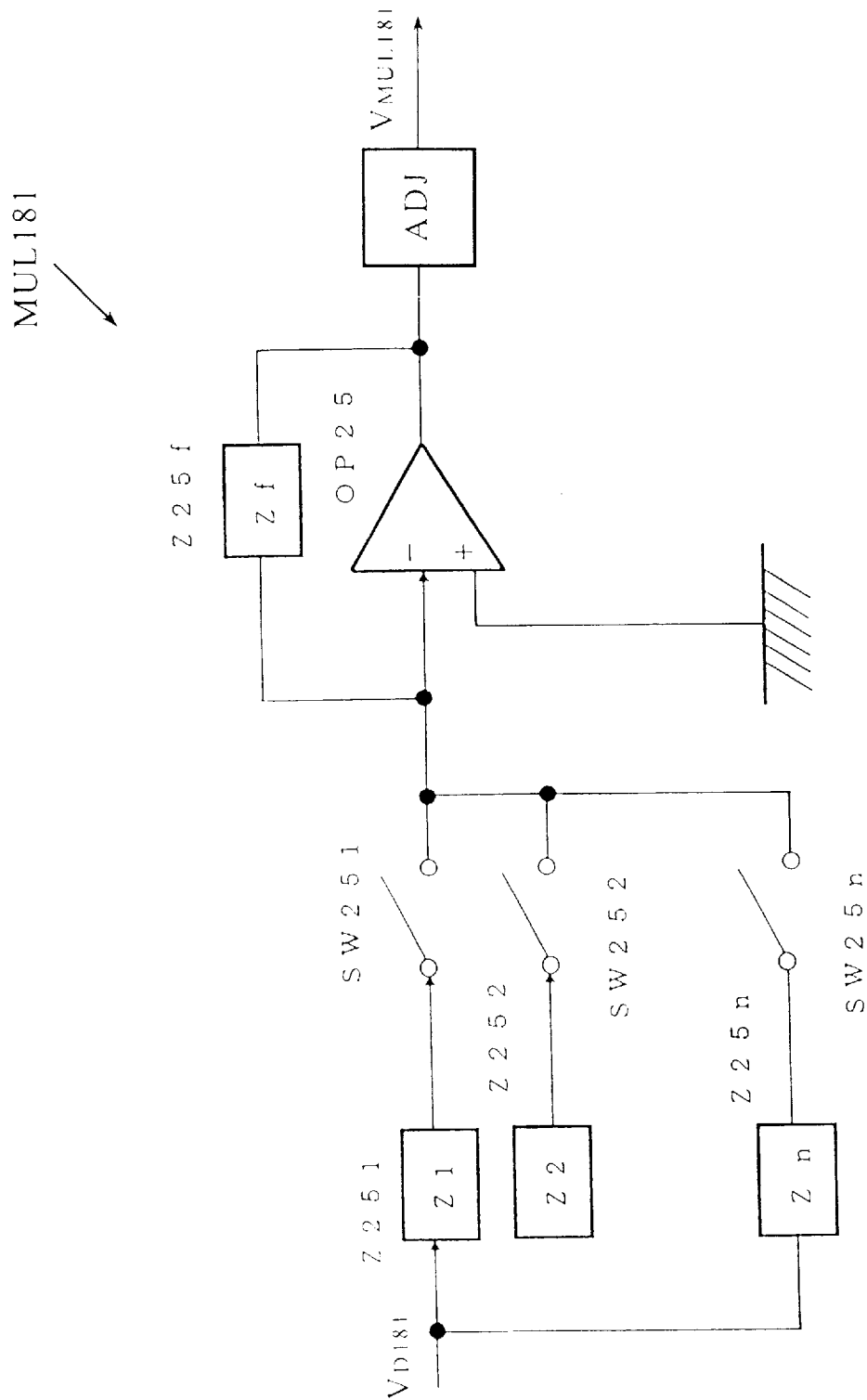
FIG. 26 is a multiplier of the matched filter shown in FIG. 19.

FIG. 26 illustrates the multiplier MUL181 (FIG. 19) of analog matched filter MF11. The output $V_{D181}$ of delay D181 is fed to different impedances Z251, Z252, . . . , Z25n. Any impedance output can be combined by the switches SW251 to SW25n, which are connected to the inverted input of the operational amplifier OP25. Non-inverted input of the operational amplifier OP25 is grounded, and the output of OP25 is fed back through feedback impedance Z25f to the inverted input of OP25. The operational amplifier OP25 works as an inverted buffer, and each impedance serves as a capacitor. Impedance Z25i is expressed with capacitor C25i as follows.

$$Z25i = \frac{1}{j\omega C25i} \quad (4)$$

By expressing the total capacitance of capacitors whose switches are closed as $\Sigma C25i$, the (output voltage of the operational amp OP25 $V_{OP25}$ is expressed as follows.

$$V_{OP25} = -\frac{\sum C25i}{C25f} V_{D181} \quad (5)$$

This is a multiplication of input voltage $V_{D181}$ by $-(\Sigma C25i/C25f)$ Switches SW251 to SW25n are arbitrarily selected to open or close. For example, if the capacitance of capacitor C25i (i=1 to n) is a power i of 2, any binary multiplier can be made by the combination. When the PN code is represented by binary digits such as (1, 0) or (1, −1), the above weighting is not necessary. As formula (5) shows, the polarity of the output is inverted. Furthermore, formula (5) does not consider coefficient polarity. Therefore, an adjuster ADJ is connected to the output of the operational amp to adjust the polarity.

Figure 27:
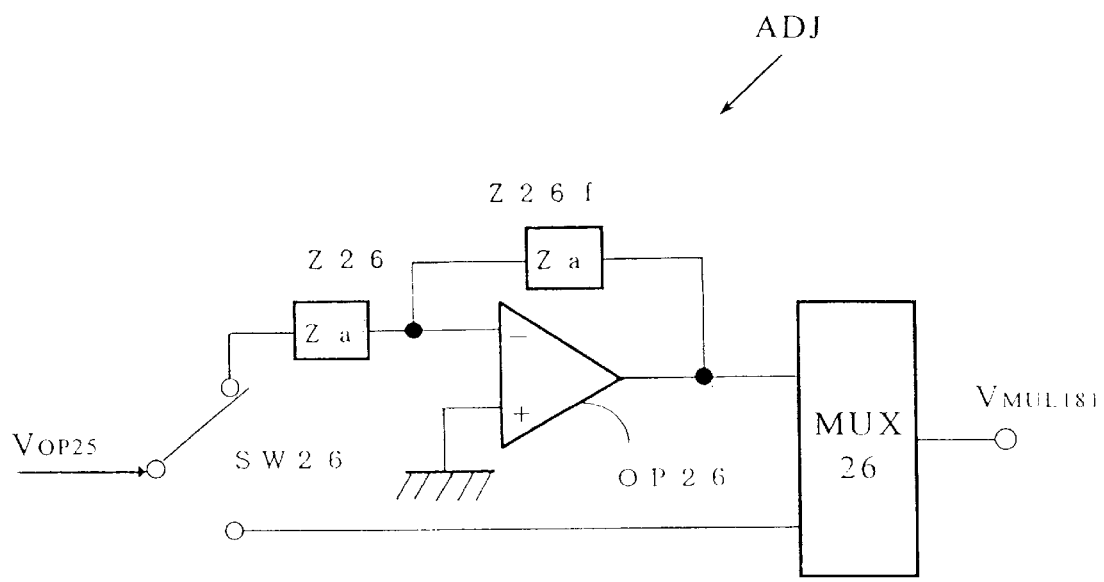
FIG. 27 is a positive and negative signal circuit used in the matched filter of FIG. 19.

FIG. 27 shows the adjuster ADJ, in which $V_{MUL181}$ is supplied through the inverse buffer or directly to a multiplexer MUX26. The multiplexer MUX26 selects one input according to the sign of the multiplier output (PN code). Impedance Z26 is connected from the output to the inverse input of the operational amplifier OP26, while its non-inverted input is grounded. Output $V_{OP26}$ of the operational amplifier OP26 is fed back as an inverted input. The output $V_{OP26}$ of the inverted buffer OP26 corresponds to the positive PN code, when input VMUL181 is a negative PN code.

Figure 28:
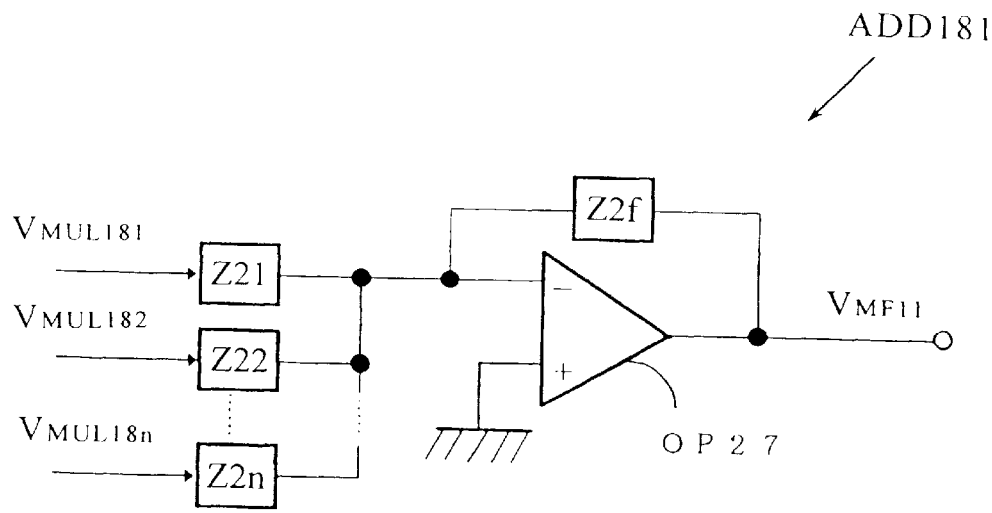
FIG. 28 is an adder in the matched filter of FIG. 19.

FIG. 28 illustrates the adder ADD181 (FIG. 19) of the matched filter MF11. In the adder ADD181, impedances Z21 to Z2n feed input signals $V_{MUL181}$ to $V_{MUL18n}$ to the inverted input of the operational amplifier OP27, in parallel. Non-inverted input of the operational amplifier OP27 is grounded. Output of the operational amplifier OP27 is fed back through impedance Z2f to the inverted input. The Impedances Z21 to Z2n and Z2f consist of capacitors C271 to C27n and C27f, respectively. The output $V_{MF11}$ of the adder ADD181 is expressed as follows.

$$V_{MF11} = -\frac{\sum_{i=1}^{n} V_{MUL18i} C27i}{C27f} \quad (6)$$

Figure 29:
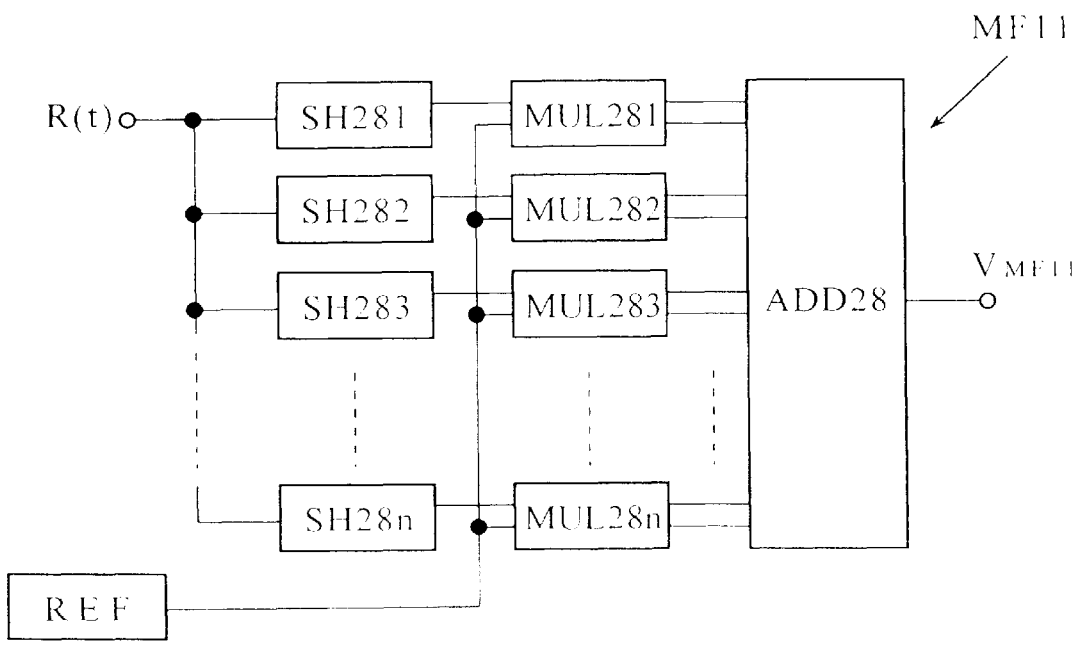
FIG. 29 is an analog matched filter of a third embodiment.
Figure 30:
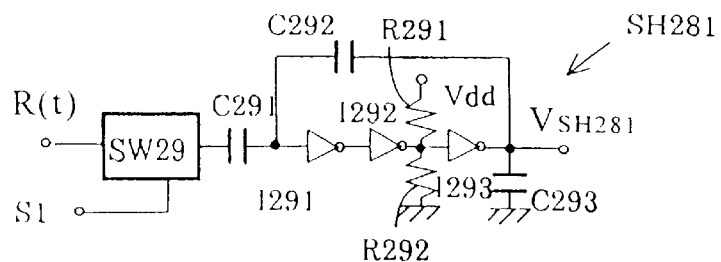
FIG. 30 is a circuit of the sample holder of FIG. 29.

FIG. 29 illustrates another type of the matched filter MF11 for a binary (1, 0) PN code. Received signal R(t) is inputted to the respective sample holders SH281 to SH28n in parallel. Inputs of multiplexers MUL281 to MUL28n are connected to the sample holders SH281 to SH28n, respectively, and to reference generator REF. Adder ADD28 is connected to the multiplexers MUL 281 to MUL28n and outputs the result as $V_{MF11}$. FIG. 30 shows the structure of sample holder SH281 of FIG. 29. Input R(t) is supplied to capacitor C291 through a switch SW29. Output of the capacitor C291 is supplied to three-stage MOS inverters I291, I292 and I293 connected in series. Output of the last MOS inverter I293 is fed back through feedback capacitor C292 to the input of the first inverter I291. The feedback capacitor C292 gives the input voltage R(t) good linearity at the output of the last inverter I293. When the switch SW29 is closed, capacitor C291 is charged to the input level R(t), and the output linearity is ensured by the feedback at the three stage MOS inverters I291 to I293. When the switch SW29 opens, sample holder SH281 holds the voltage of input R(t). Output of the last inverter I293 is grounded through the capacitor C293, while output of the second inverter I292 is connected to the power source Vdd and the ground through a pair of equivalent resistors R291 and R292, respectively. This structure prevents an oscillation of the inverse amplifier having the feedback system. Sample holders SH282 to SH28n have the same structure as SH281, and their explanations will be omitted.

Figure 31:
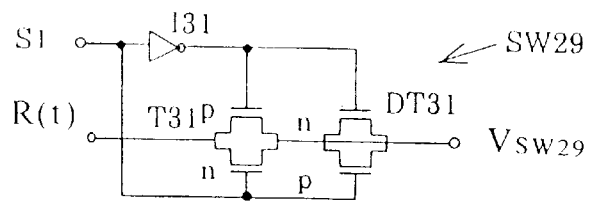
FIG. 31 is a circuit of the switch shown in FIG. 30.

FIG. 31 shows the switch SW29 of FIG. 30. The switch comprises an n-MOS transistor T31 whose source and drain are connected to drain and source of p-MOS dummy transistor DT31, respectively. Input R(t) is applied to the drain of the n-MOS transistor T31 whose source is outputted as $V_{SH29}$ through the dummy transistor DT31. Control signal S1 is inputted to the gate of the n-MOS transistor T31. The control signal is also inverted by an inverter I131 and then inputted to the gate of the p-MOS dummy transistor DT31. When the signal S1 is high, transistors T31 and DT31 are conductive. When the signal S1 is low, transistors T31 and DT31 are not conductive.

Figure 32:
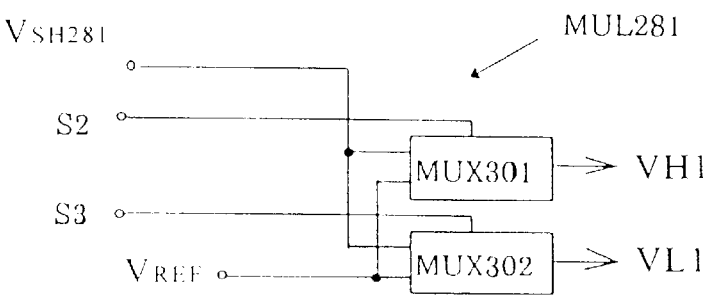
FIG. 32 is a circuit of the multiplier shown in FIG. 29.

FIG. 32 shows multiplier MUL281 including two multiplexers MUX301 and MUX 302, to which output $V_{SH281}$ of the sample holder SH281 and a reference $V_{REF}$ from the reference generator REF are connected. Multiplexers MUX301, MUX302 are controlled by control signals S2 and S3, respectively. The control signals S2 and S3 are inverse of each other, so that, when one multiplexer outputs $VSH_{2811}$ another multiplexer outputs $V_{REF}$. When multiplying the input $V_{SH281}$ by the spreading code "1", multiplexer MUX301 outputs $V_{SH281}$. When multiplying the input voltage by the spreading code "−1", multiplexer MUX302 outputs $V_{SH281}$. Outputs of multiplexers MUX301 and MUX302 are shown as VH1 and VL1 to represent high and low level responses, respectively.

Figure 33:
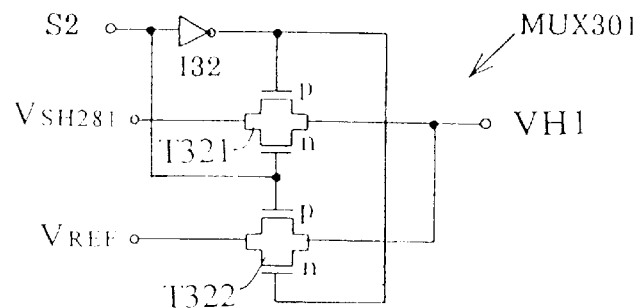
FIG. 33 is a circuit of the multiplexer shown in FIG. 32.

FIG. 33 shows the multiplexer MUX 301 having a pair of n-type and p-type MOS transistors T321 and T322. The sources of the transistors T321 and T322 are connected to a common output VH1. The drain of n-MOS transistor T321 inputs a signal $V_{SH281}$ from the sample holder SH281, while the drain of n-MOS transistor T322 inputs a reference voltage $V_{REF}$. Control signal S2 is fed to the gates of the n-MOS transistor T321 and p-MOS transistor T322. An inverter I32 inverts the control signal S2 and feeds it to the gates of p-MOS transistor T321 and n-MOS transistor T322. When the control signal S2 is high, the transistor T321 is conductive while the transistor T322 is not. When the control signal S2 is low, transistor T322 is conductive while transistor T321 is not. Thus, multiplexer MUX301 can selectively output either $V_{SH281}$ or $V_{REF}$ by the control signal S2.

Multiplexer MUX302 has the same structure as MUX301, but the connection of $V_{SH281}$ and $V_{REF}$ are reversed. That is, $V_{REF}$ is connected to the n-MOS transistor T321, and $V_{SH281}$ is connected to the P-MOS transistor T322. Accordingly, multiplexer MUX302 outputs a signal opposite to the multiplexer MUX301 output. Multiplexer MUX302 outputs $V_{REF}$ when multiplexer MUX301 outputs $V_{SH281}$. Multiplexer MUX302 outputs $V_{SH281}$ when MUX301 outputs $V_{REF}$. Control signal S2 corresponds to the spreading code. When control signal S2 is "1", the multiplier MUL281 outputs $V_{SH281}$ from the multiplexer MUX301 and $V_{REF}$ from the multiplexer MUX302. When S2 is "0" (low), the multiplier MUL281 output $V_{REF}$ from the multiplexer MUX301 and $V_{SH281}$ from the multiplexer MUX302. The multiplexers MUX301 and MUX302 supply their outputs to adder ADD28.

Figure 34:
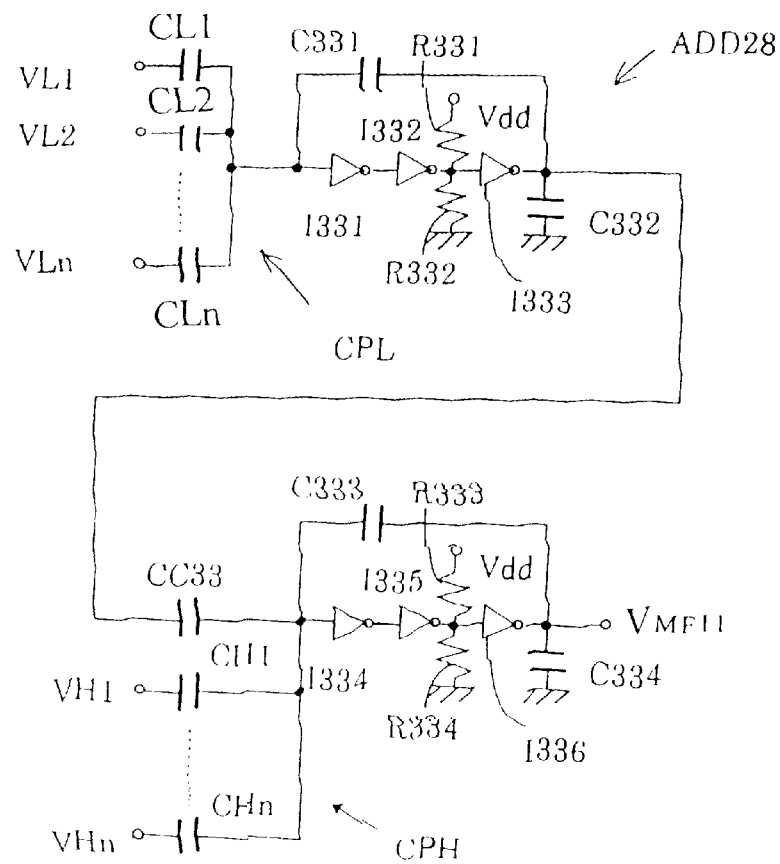
FIG. 34 is a circuit of the adder shown in FIG. 29.

FIG. 34 shows adder ADD28, having a capacitance coupling circuit CPH which receives high level signals VH1 to VHn from multipliers MUL281 to MUL28n, and a capacitance coupling circuit CPL which receives low level signals VL1 to VLn from the multipliers MUL281 to MUL28n. The capacitance coupling circuit CPL includes capacitors CL1 to CLn connected in parallel, and the capacitance coupling circuit CPH includes capacitors CH1 to CHn also connected in parallel. Output of the capacitance coupling circuit CPL is connected to the first input of the three MOS inverters I331, I332, and I333, connected in series. Output of the last inverter I333 is fed back through the feedback capacitor C331 to the first stage input. The three-stage inverters ensures the linearity of input/output relationship by its sufficiently large open loop gain.

Output of capacitance coupling circuit CPH is connected to the first input of the three-stage MOS inverters I334, I335, I336 connected in series. Output of the last inverter I336 is fed back through the feedback capacitor C333 to the first stage input. The three-stage inverters ensures the linearity of the input/output relationship through its sufficiently large open loop gain. Output of the inverter I333 is connected to the input of I334 through coupling capacitor CC33 positioned in parallel to the capacitance coupling circuit CPH. Thus, the sum of the inverse output from CPL and positive output from CPH is input to the three-stage inverters I334 to I336.

The outputs of the last MOS inverters I333 and I336 are grounded through ground capacitors C332 and C334, respectively. The outputs of the second MOS inverters I332 and I335 are connected to both of power source voltage Vdd and ground through pairs of equivalent resistors R331 and R332, and R333 and R334, respectively. This circuit prevents oscillation of the inverted amplifier having the feedback system. Adder ADD28 calculates as formula (7). Since the mutual relations of the capacitors are set as formulas (8) to (10), calculation result of formula (11) is obtained.

$$V_{MFII} = Vdd - \frac{\left(Vdd - \frac{\sum_{i=1}^{n} VLi \cdot CLi}{C331}\right) \cdot CC33 + \sum_{i=1}^{n} VHi + CHi}{C333} \quad (7)$$

$$CL1 = CL2 = \ldots = CLn \quad (8)$$

$$CH1 = CH2 = \ldots = CHn \quad (9)$$

$$C331 = C333 = CC33 = n \cdot CLi = n \cdot CHi \quad (10)$$

$$V_{MFII} = \frac{\sum_{i=1}^{n}(VLi - VHi)}{n} \quad (11)$$

Outputs VLi and VHi are expressed as formulas (12) and (13) using a reference voltage $V_{REF}$.

$$VHi = V_{REF} + vhi \quad (12)$$

$$VLi = V_{REF} + vli \quad (13)$$

By inserting formulas (12) and (13) into formula (11), formula (14) is obtained.

$$V_{MFII} = \frac{\sum_{i=1}^{n}(vli - vhi)}{n} \quad (14)$$

Since data is also inverted by the three inverters I291 to I293 in the sample holders SH281 to SH28n, the signal held by the sample holders SH281 to SH28n is expressed as S(t−i*Tc), with a given time "t", chip time Tc, and natural number "i". Formula (14) is rewritten as formula (15) with the multiplied PN code Pni.

$$V_{MFII} = \frac{\sum_{i=1}^{n} PNi \cdot S(t - i \cdot Tc)}{n} \quad (15)$$

As expressed by equation (15), the matched filters execute general correlation operations for the received signal R(t). PN codes are circulated for the sample holders, and the relations between the sample holders and PN codes are updated one chip at a time. In the aforementioned calculation, output is normalized by the number of inputs, "n". Therefore, the maximum voltage does not exceed the power source voltage, and stable operation is ensured.

Figure 35:
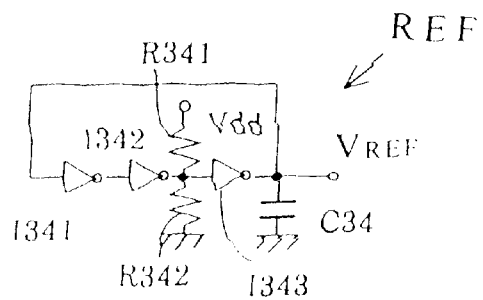
FIG. 35 is a circuit for generating a reference voltage used in the multiplexer of FIG. 32.

FIG. 35. shows the reference generator REF which generates the reference voltage $V_{REF}$. The reference generator REF comprises three inverters I341, I342, and I343, connected in series, with the last output fed back to the first input. Similar to the aforementioned adder, oscillation is prevented by the ground capacitor C34 and a pair of equivalent resistors R341 and R342. In the reference generator REF, the output is converged to the stable point, where the input and output voltages become equal, and the desired reference voltage is generated by setting a threshold voltage of each MOS inverter. To ensure adequate dynamic ranges in positive and negative directions, reference voltage is set to Vdd/2 ($V_{REF}=V_{dd}/2$), where Vdd is the power source voltage of the MOS inverter.

Figure 36:
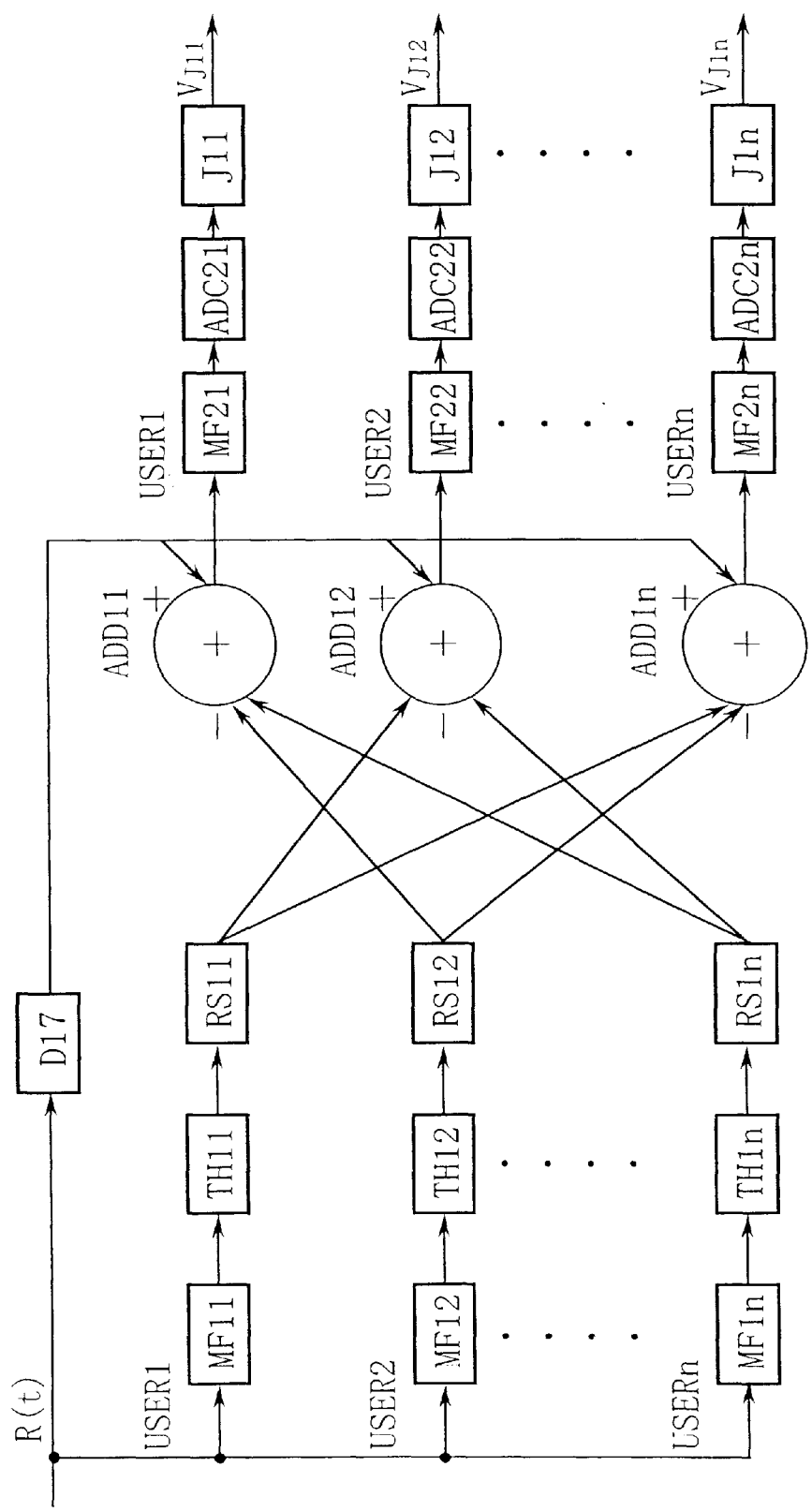
FIG. 36 is a block diagram of the demodulator according to a fourth embodiment of the invention.

FIG. 36 shows another multi-user demodulator. In this embodiment, more circuits are analog as compared with the above embodiments. That is, dominant wave extractors TH11 to TH1n and respreading circuits RS11 to RS1n are also analog. Therefore, A/D converters ADC11 to ADC1n and D/A converters DAC11 to DAC1n in FIG. 18 are not necessary and are eliminated in this embodiment.

FIG. 37 illustrates an example of the analog dominant wave extractor TH11. The analog dominant wave extractor TH11 comprises a comparator CMP36, which receives output $V_{MF11}$ of the matched filter MF11, and a threshold voltage $V_{thresh}$. Two voltages, high and low level voltages V1, V2, are also applied to CMP36. When $V_{MF11} \geq V_{thresh}$, the comparator CMP36 outputs high voltage V1. When $V_{MF11} \leq V_{thresh}$, low voltage V2 is output.

FIG. 38 shows the relation between the input and output of CMP36. When the input $V_{MF11}$ exceeds the threshold voltage $V_{thresh}$, the output $V_{TH11}$ abruptly changes from V1 to V2. Thus, if matched filter output $V_{MF11}$ exceeds the threshold, the output of the dominant wave extractor becomes V1, and if $V_{MF11}$ does not exceed the threshold, the output of the dominant wave extractor becomes V2.

FIG. 39 shows the output of the dominant wave extractor TH11, when processing the matched filter output $V_{MF11}$ in FIG. 2. The desired wave is clearly extracted. Dominant wave extractors TH12 to TH1n have the same construction as the dominant wave extractor TH11 and their explanations are omitted.

Figure 40:
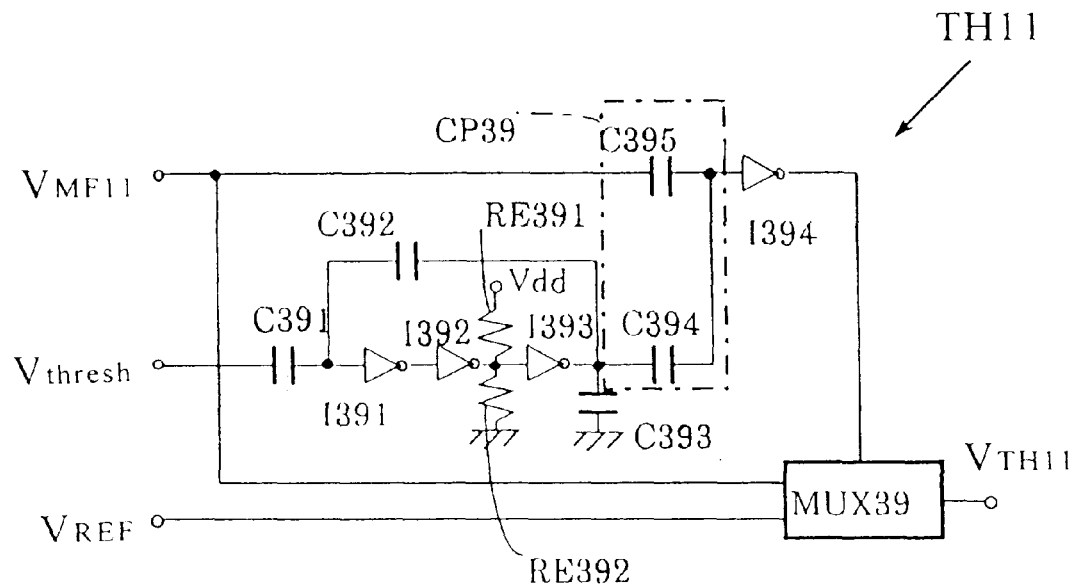
FIG. 40 is another example of the analog dominant wave extractor.

FIG. 40 illustrates another example of the dominant wave extractor TH11. This dominant wave extractor has a multiplexer MUX39, which inputs matched filter output $V_{MF11}$, and a reference voltage $V_{REF}$. A signal obtained by subtracting the threshold $V_{thresh}$ from $V_{MF11}$ controls multiplexer MUX39. Threshold $V_{thresh}$ is input through capacitor C391 to the three-stage inverters I391, I392, I393 that serve as an inverse buffer. The output of the last inverter I393 is fed back through capacitor C392 to the input of the first inverter I391. Output of the last inverter I393 is also connected to the ground capacitor C393, while output of the second inverter I392 is connected to a pair of equivalent resistors RE391 and RE392.

Output of the last inverter I393 and matched filter output $V_{MF11}$ are input to capacitive coupling circuit CP39 consisting of capacitors C394 and C395. Output of capacitive coupling circuit CP39 is further connected to the input of the inverter I394. The three-stage inverters generate inverse output of $V_{thresh}$ with good linearity. The capacitive coupling circuit CP39 generates the sum of the output of the inverter I393 and input voltage $V_{MF11}$. Supposing that capacitance C394 equals C395 (C394=C395), the output $V_{CP39}$ of capacitive coupling circuit CP39 is expressed as follows.

$$V_{CP39} = \frac{C394(Vdd - V_{thresh}) + C395 \cdot V_{MF11}}{C394 + C395} = \frac{Vdd}{2} + \frac{V_{MF11} - V_{thresh}}{2} \quad (16)$$

FIG. 41 shows the processed matched filter output through the dominant wave extractor TH11. The inverter I394 outputs 0V when the input voltage of the inverter I394 is equal to or greater than Vdd/2 (i.e., when $V_{MF11} \geq V_{thresh}$). When $V_{MF11} < V_{thresh}$, the output of inverter I394 is Vdd. Thus, the two-value signal controls multiplexer MUX39. Multiplexer MUX39 outputs $V_{MF11}$ when $V_{MF11} \geq V_{thresh}$, while it outputs $V_{REF}$ when $V_{MF11} < V_{thresh}$. Dominant wave extractors TH12 to TH1n have the same structure as the dominant wave extractor TH11 and their explanations are omitted.

Figure 42:
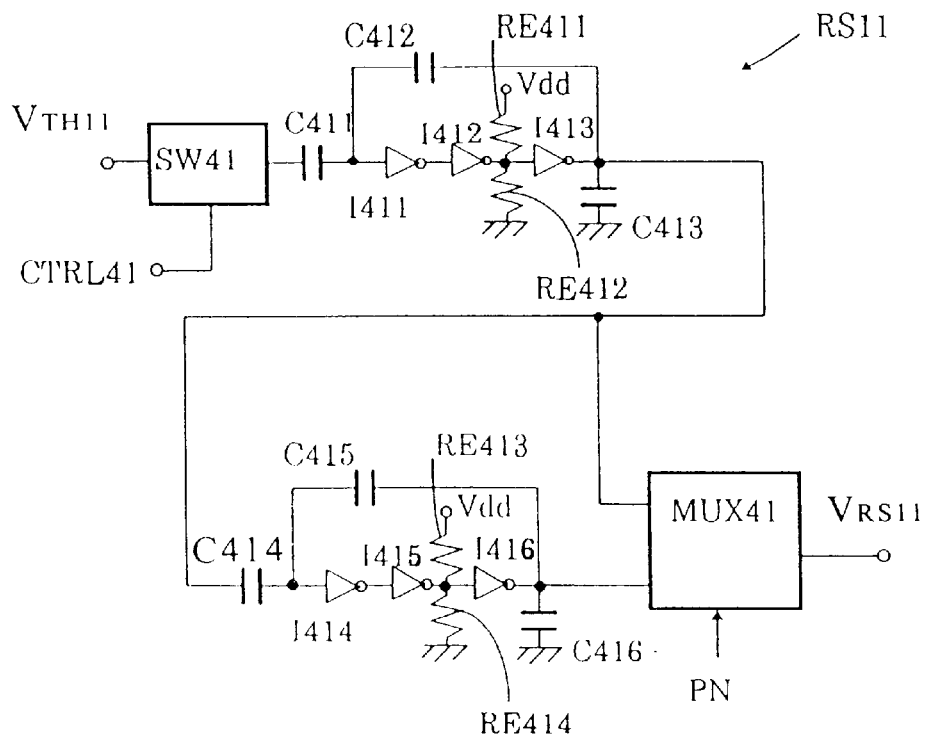

FIG. 42 illustrates an example of the respreading circuit RS11. In the respreading circuit RS11, the input voltage $V_{TH11}$ is connected to the switch SW41. The switch SW41 is closed and opened by a control signal CTR41 in an appropriate timing. Output of the switch SW41 is input through capacitor C411 to three-stage inverters I141, I142, I143 that serve as an inverting buffer. Output from the three-stage inverters is further input to the similar three-stage inverters I414, I415, I416 through capacitor C414. Output of inverters I413 and I416 are fed back to the input of inverters I411 and I414, respectively. Output of inverters I413 and I416 are also connected to capacitors C413 and C416, respectively, while output of the second-stage inverters I412 and I415 are connected to pairs of the equivalent resistors RE411 and RE412, and RE413 and RE414.

Output of inverters I413 and I416 are connected to the input of multiplexer MUX41 which is switched by a two-valued PN code. When the PN code is "1", the multiplexer MUX41 selects the output of the inverter I416, and outputs a non-inverted voltage $V_{TH11}$ that has passed through two of three-stage inverse buffers. When the PN code is "−1" or "0", the multiplexer MUX41 selects the output of the inverter I413, and outputs an inverted $V_{TH11}$ that has passed a single three-stage inverse buffer. The output $V_{RS11}$ of the multiplexer MUX 41 is equivalent to the product of the input voltage $V_{TH11}$ and the PN code. This is a spread signal of $V_{TH11}$. Respreading circuits RS12 to RS1n have the same structure as RS11 and their explanations are omitted.

Figure 43:
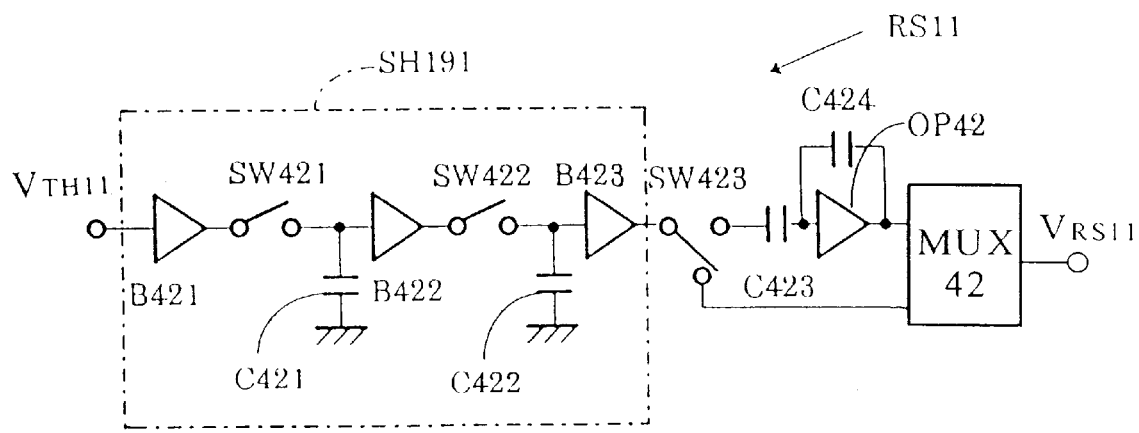

FIG. 43 illustrates another example of the respreading circuit RS11. A circuit similar to FIG. 27 is positioned after the sample holder SH191 of FIG. 21. The sample holder SH191 has a buffer B421, a switch SW421, a buffer B422, a switch SW422, and a buffer B423 connected in series. Output from the switches SW421 and SW422 are connected to the ground capacitors C421 and C422, respectively. Output of the buffer B423 is connected to the switch SW423 that has one input and two outputs.

The first output is fed to a multiplexer MUX42 through an inverse buffer IB composed of an impedance C423, an operational amplifier OP42 and a feedback capacitor C424. The second output of the switch SW423 is connected to the multiplexer MUX42 directly. The multiplexer MUX 42 selects a signal given by the switch SW423. The respreading circuit RS11 holds input $V_{TH11}$ for a while by the sample holder SH191, and then outputs it in an appropriate timing after inverting by the inverse buffer IB, or without inverting it.

Although the present invention was described through several embodiments, the scope of the invention is not limited by the embodiments. It is clear for the person skilled in the art that various modifications can be made and that such modifications are within the scope of the invention as clear from the following claims.

For example, dominant extractors TH11 to TH1n, respreading circuits RS11 to RSln, adders ADD11 to AD1n, and matched filters MF21 to MF2n, can be repeatedly provided in front of the A/D converters ADC21 to ADC2n in FIG. 22. In this case, threshold levels of the second dominant extractors TH11 to TH1n are set closer to the peak level than those of the first dominant extractors to produce purer single user signals.

As described, with the multi-user demodulator and the demodulating method of the invention, the received signal is despread. Each user signal is extracted from the despread signal by a simple threshold process and then spread again. The respread signals other than a specific user signal are subtracted from the received signal to extract the specific user signal with less noise. According to the present invention, conventional synchronization issues are eliminated, and no interference canceler is required.

What is claimed is:

1. A multi-user demodulator for a base station communicating with user stations by DS=CDMA spectrum spread communication, comprising:

a plurality of first matched filters, each of said first matched filters correlates with a received signal with a respective user's spectrum spreading code assigned as a tap coefficient;

a plurality of wave extractors, each of said wave extractors is connected to one of said first matched filters and extracts a high voltage wave as a dominant wave from an output of said one first matched filter by a threshold operation, said threshold operation using a threshold level based on said output of said one first matched filter;

a plurality of respreading circuits, each of said respreading circuits respreads a spectrum of said dominant wave obtained by said dominant wave extractor with said respective user's spectrum spreading code;

a delay circuit which delays said received signals by a predetermined period;

a plurality of first adders, each of said first adders subtracts output of said respreading circuits other than a specific user's respread signal from an output of said delay circuit;

a plurality of second matched filters, each of said second matched filters despreads a spectrum of an output of said respective first adder with spectrum spreading codes assigned to the specific user; and a plurality of decision circuits, each of said decision circuits determines a respective user's signal from each of said second matched filters.

2. The multi-user demodulator according to claim 1, wherein each of said wave extractors extracts said high voltage wave by said threshold operation using a product of a maximum output of said first matched filter by a predetermined ratio as a threshold.

3. The multi-user demodulator according to claim 1, wherein each of said first and second matched filters comprises (a) a plurality of sample holders, each of said sample holders having a switch connected to an input signal, a first capacitor connected on one side to an output of said switch, a first inverting amplifier connecting to said first capacitor on a second side and comprising an odd number of MOS inverters, a first feedback capacitor which feeds an output of said first inverting amplifier back to an input of said first inverting amplifier, (b) first and second multiplexers, each of said multiplexers alternatively outputs an output of said first inverting amplifier or a reference voltage;

(c) a second adder comprising a plurality of second capacitors, each of said second capacitors receiving each output of said first multiplexer, a second inverting amplifier comprising an odd number of MOS inverters and receiving outputs of said second capacitors in parallel, and a second feedback capacitor which feeds an output of said second inverting amplifier back to an input thereof of said second inverting amplifier;

(d) a third adder comprising a plurality of third capacitors, each of said third capacitors receiving each output of said second multiplexer and an output of said second adder, a third inverting amplifier comprising an odd number of MOS inverters and receiving outputs of said third capacitors in parallel to subtract a sum of said second multiplexer output from said second adder, and a third feedback capacitor which feeds an output of said third inverting amplifier back to an input of said third inverting amplifier; and (e) a controller that closes one switch of said sample holders while opening other switches, and controls said first and second multiplexers to select said output of said first inverting amplifier or said reference voltage.

4. The multi-user demodulator according to claim 1, wherein each of said first and second matched filters comprises a second delay circuit which delays said received signal;

a plurality of multipliers which multiply each output of said second delay circuit by an associated PN code; and a second adder that sums up outputs of said multipliers.

5. The multi-user demodulator according to claim 4, wherein each said multiplier comprises a plurality of impedances connected to said received signal in parallel;

a plurality of first switches connected to an output of said respective impedances, said first switches selectively closing according to said PN codes;

a plurality of operational amplifiers comprising an inverted input that receives outputs of said first switches in parallel and a non-inverted input that is grounded; and a feedback impedance which feeds an output of each of said respective operational amplifiers back to each respective inverted input.

6. The multi-user demodulator according to claim 5, wherein each said multiplier further comprises a one-input-two-output code switch connected to said output of said respective operational amplifier;

a code-input impedance connected to a first output of said code switch, a second operational amplifier comprising an inverted input connected to said code-input impedance and an output fed back to said inverted input through a code feedback impedance; and said code feedback impedance being equal to said code input impedance, wherein, when said PN code is positive, said code switch is connected to said first output so that said second operational amplifier outputs a multiplication result multiplied by said PN code, and wherein, when said PN code is negative, said code switch is connected to said second output so that said second output outputs said multiplication result.

7. The multi-user demodulator according to claim 4, wherein said second adder comprises a plurality of adder-input impedances, each comprising two ends, one of said ends of each impedance being connected to each output of said multipliers;

an operational amplifier comprising an inverted input connected to said other ends of said adder-input impedances in parallel and a non-inverted input being grounded; and an adder feedback impedance which feeds an output of said operational amplifier back to said inverted input of said operational amplifier, wherein said adder feedback impedance is equal to said adder-input impedance.

8. The multi-user demodulator according to claim 1, wherein said respreading circuit comprises a switch connected to an input of said respreading circuit;

a first inverting buffer that inverts an output of said switch;

a second inverting buffer that inverts an output of said first inverting buffer; and a multiplexer that selectively outputs one signal from said first and second inverting buffers.

9. The multi-user demodulator according to claim 1, wherein said respreading circuit comprises a sample holder connected to an input of said respreading circuit to hold an input signal;

an one-input-two-output switch connected to an output of said sample holder to receive the signal held by said sample holder; and an inverting buffer connected to a first output of said one-input-two-output switch.

10. The multi-user demodulator according to claim 4, wherein said delay circuit includes a plurality of sample holders connected in series; and said received signal is sequentially transferred from said first sample holder to a last stage sample holder.

11. The multi-user demodulator according to claim 10, wherein said sample holders comprise a plurality of buffers and a plurality of switches, said buffers and switches being alternately connected in series; and a plurality of ground capacitors connecting each output of said switches to ground.

12. The multi-user demodulator according to claim 11, wherein each buffer is an operational amplifier having a non-inverted input and an output fed back to an inverted input.

13. The multi-user demodulator according to claim 11, wherein said buffer comprises an input impedance;

an operational amplifier comprising an inverted input, an output, and a non-inverted input that is grounded; and a feedback impedance which feeds an output of said operational amplifier back to said inverted input of said operational amplifier.

14. The multi-user demodulator according to claim 1, wherein said dominant wave extractor has an operational amplifier comprising a non-inverted input connected to an output of said matched filter; and an inverted input receiving a threshold voltage.

15. The multi-user demodulator according to claim 1, wherein each of said dominant wave extractor comprises a capacitive coupler that adds said output of said first matched filter to an inverse of a threshold voltage; and a multiplexer that selects said output of said first matched filter or a reference voltage by an output of said capacitive coupler.

16. A base station communicating with user stations by DS-CDMA spectrum spread communication, comprising:

a multi-user demodulator which demodulates a received signal;

an antenna which feeds said received signal to said demodulator;

a multiplexer which multiplexes said signal demodulated signal; and a network switch which switches said multiplexed signal to a network, wherein said demodulator comprises a plurality of first matched filters, each of said first matched filters correlates with a received signal with a respective user's spectrum spreading code assigned as a tap coefficient;

a plurality of wave extractors, each of said wave extractors is connected to one of said first matched filters and extracts a high voltage wave as a dominant wave from an output of said one first matched filter by a threshold operation, said threshold operation using a threshold level based on an output of said one first matched filter;

a plurality of respreading circuits, each of said respreading circuits respreads a spectrum of said dominant wave obtained by said dominant wave extractor with said respective user's spectrum spreading code;

a delay circuit which delays said received signal by a predetermined period;

a plurality of first adders, each of said first adders subtracts outputs of respreading circuits other than a specific user's respread signal from an output of said delay circuit;

a plurality of second matched filters, each of said second matched filters despreads a spectrum of an output of said respective first adder with said spectrum spreading codes assigned to the specific user; and a plurality of decision circuits, each of said decision circuits determines a respective user's signal from each of said second matched filters.

17. The base station according to claim 16, wherein each of said first and second matched filters comprises (a) a plurality of sample holders, each of said sample holders having a switch connected to input signal, a first capacitor connected on one side to an output of said switch, a first inverting amplifier connecting to said first capacitor on a second side and comprising an odd number of MOS inverters, a first feedback capacitor which feeds an output of said first inverting amplifier back to an input of said first inverting amplifier;

(b) first and second multiplexers, each of said multiplexers alternatively outputs an output of said first inverting amplifier or a reference voltage;

(c) a second adder comprising a plurality of second capacitors, each of said second capacitors receiving each output of said first multiplexer, a second inverting amplifier comprising an odd number of MOS inverters and receiving outputs of said second capacitors in parallel, and a second feedback capacitor which feeds an output of said second inverting amplifier back to an input thereof of said second inverting amplifier;

(d) a third adder comprising a plurality of third capacitors, each of said third capacitors receiving each output of said second multiplexer and an output of said second adder, a third inverting amplifier comprising an odd number of MOS inverters and receiving outputs of said third capacitors in parallel to subtract a sum of said second multiplexer output from said second adder, and a third feedback capacitor which feeds an output of said third inverting amplifier back to an input of said third inverting amplifier; and (f) a controller that closes one switch of said sample holders while opening other switches, and controls said first and second multiplexers to select said output of said first inverting amplifier or said reference voltage.

18. A multi-user demodulating method for a base station communicating with user stations by DS-CDMA spectrum spread communication, said users' stations having different spectrum spreading codes, said method comprising:

acquiring a correlation of a received signal with each said different spectrum spreading codes assigned as a tap coefficient to produce a correlation signal;

extracting a high voltage wave as a dominant wave from each said correlation signal by a threshold operation using a threshold level based on each said correlation signal;

respreading a spectrum of said dominant wave with a respective user's spectrum spreading code;

delaying said received signal by a predetermined period;

subtracting outputs of respreading circuits other than a specific user's respread signal from said delayed signal;

despreading said subtracted signal with said spectrum spreading codes assigned to a specific user; and determining a respective user's signal from said despread signal.

19. The multi-user demodulating method according to claim 18, wherein said extracting is based on a threshold operation using a product of a maximum correlation signal by a predetermined ratio.

20. The multi-user demodulating method according to claim 18, wherein said correlation acquiring comprises delaying said received signal;

multiplying said delayed signal by an associated PN code; and adding up said multiplied signal.

* * * * *